United States Patent [19]
Katoh et al.

[11] Patent Number: 4,746,990
[45] Date of Patent: May 24, 1988

[54] DETACHABLE UNIT ELECTRONIC CAMERA

[75] Inventors: Akira Katoh; Masatoshi Ida, both of Hachioji; Yutaka Yunoki, Kunitachi; Hisayuki Harada, Hachioji; Manabu Inoue, Kokubunji; Yoshio Fukuda, Hino, all of Japan

[73] Assignee: Olympus Optical Co., Ltd., Tokyo, Japan

[21] Appl. No.: 797,025

[22] Filed: Nov. 12, 1985

[51] Int. Cl.⁴ .................. H04N 9/79; H04N 5/781
[52] U.S. Cl. .............................. 358/310; 358/906
[58] Field of Search ............... 360/33.1, 35.1; 358/310, 335, 906, 909

[56] References Cited

U.S. PATENT DOCUMENTS

| | | | |
|---|---|---|---|
| 4,366,501 | 12/1982 | Tsunekawa et al. | 358/310 |
| 4,447,837 | 5/1984 | Hirata et al. | 360/33.1 |
| 4,507,686 | 3/1985 | Kimura | 358/310 |
| 4,507,689 | 3/1985 | Kozuki et al. | 360/33.1 |
| 4,527,205 | 7/1985 | Konishi | 360/35.1 |
| 4,531,164 | 7/1985 | Maeda et al. | 360/33.1 |
| 4,539,601 | 9/1985 | Komine | 360/33.1 |
| 4,547,815 | 10/1985 | Kimura | 358/335 |
| 4,553,175 | 11/1985 | Baumeister | 358/310 |
| 4,555,735 | 11/1985 | Usuki et al. | 358/330 |
| 4,570,188 | 2/1985 | Ichiyanagi | 358/335 |
| 4,571,627 | 2/1986 | Stempeck | 358/906 |
| 4,599,657 | 7/1986 | Kinoshita et al. | 358/335 |
| 4,604,668 | 8/1986 | Lemelson | 358/906 |

FOREIGN PATENT DOCUMENTS

| | | |
|---|---|---|
| 24744 | 3/1981 | European Pat. Off. |
| 58-182964 | 4/1982 | Japan. |
| 57-171758 | 8/1982 | Japan. |
| 58-139571 | 8/1983 | Japan. |

*Primary Examiner*—Donald McElheny, Jr.
*Attorney, Agent, or Firm*—Louis Weinstein

[57] ABSTRACT

A detachable unit electronic camera includes three detachable units, namely, a photographing unit, a record/playback unit and a picture monitor unit. The photographing unit has the function to convert an output signal from a camera into a luminance signal and color difference signals. The record/playback unit has the function of magnetically recording an output signal from the photographing unit on a magnetic disc and also the function of reading a signal which is previously recorded on the magnetic disc. The picture monitor unit has the function of displaying a picture in response to an output signal from the photographing unit or a signal which is reproduced from the record/playback unit.

21 Claims, 20 Drawing Sheets

F I G. 8
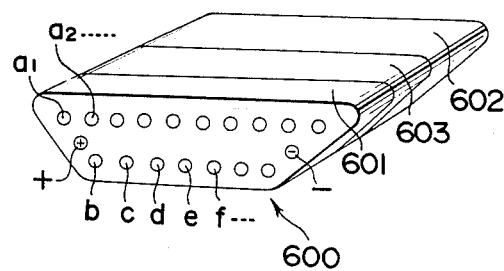
F I G. 9
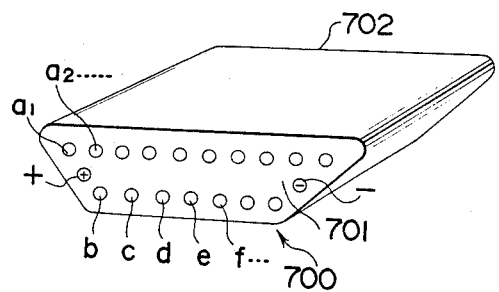

FIG. 10
FIG. 11
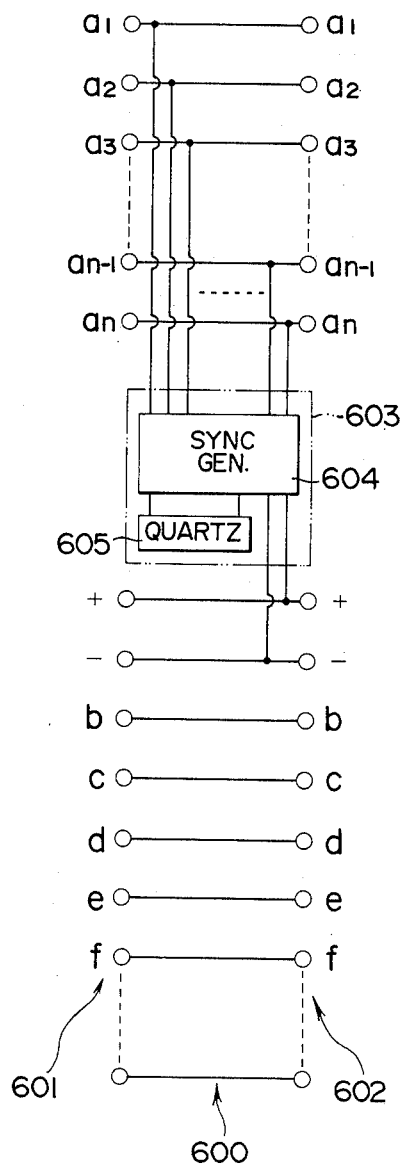
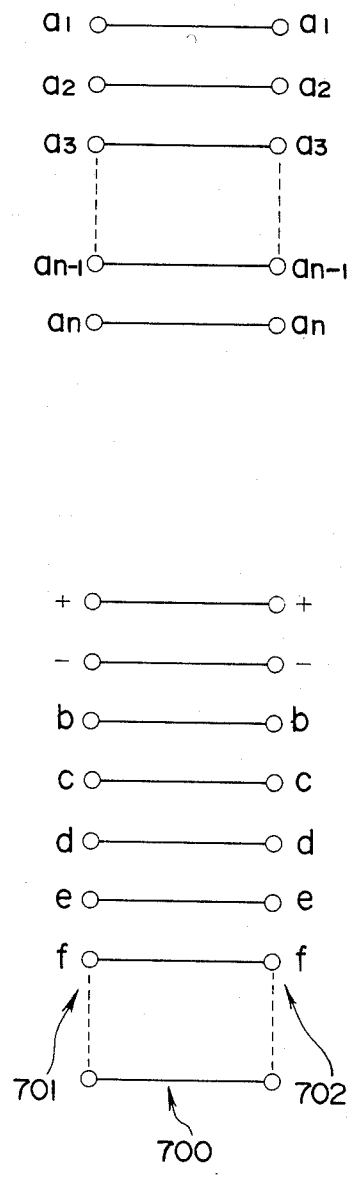

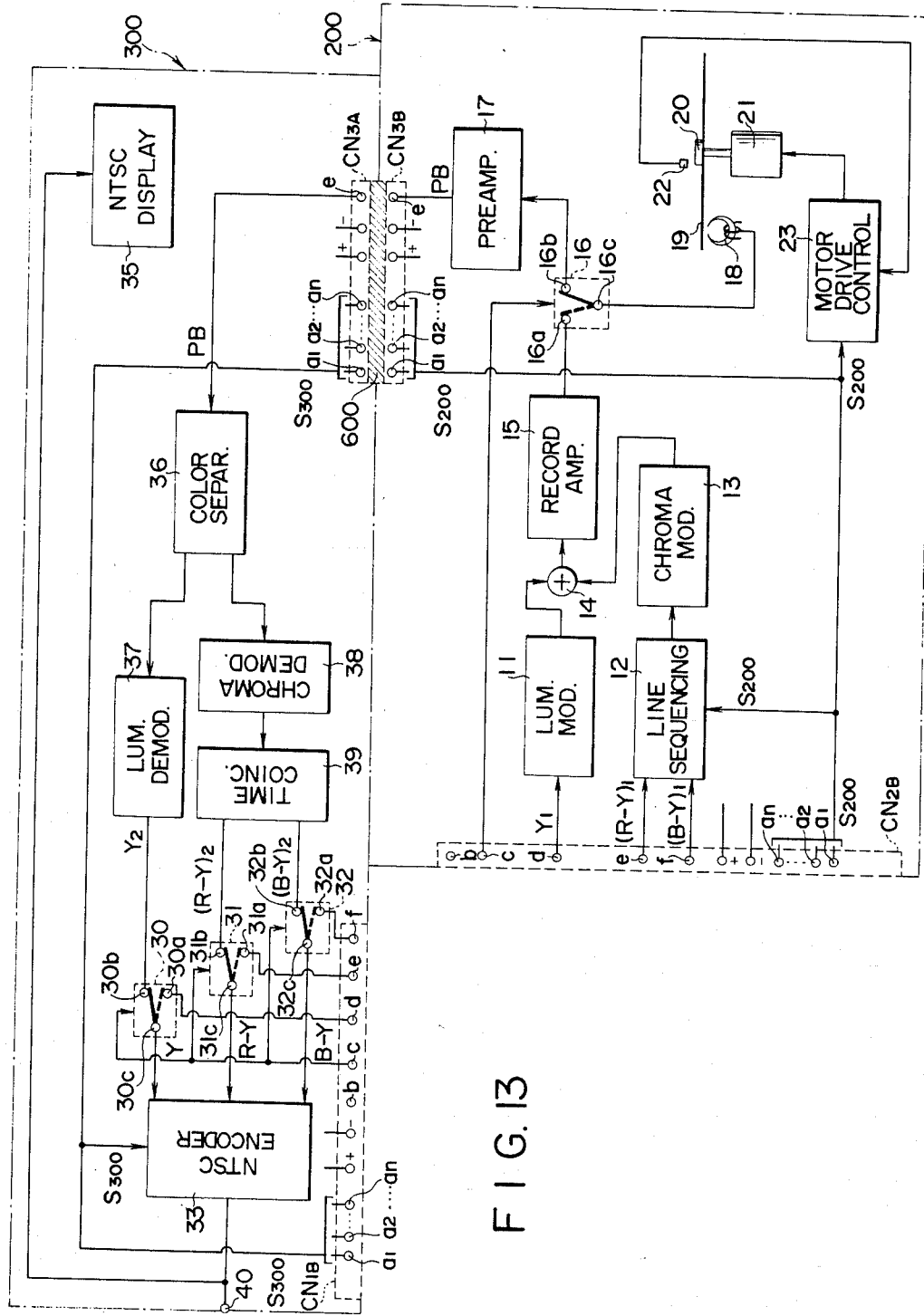
F I G. 13

DETACHABLE UNIT ELECTRONIC CAMERA

FIELD OF THE INVENTION AND RELATED ART STATEMENT

The invention relates to an electronic camera which performs a photoelectric conversion of an image of an object being photographed for recording on a magnetic recording medium, and more particularly, to a detachable unit electronic camera which comprises detachable units including a camera or photographing unit, a record/playback unit and a picture monitor unit.

Recently an electronic camera has appeared on the market which converts an image of an object being photographed into an electrical signal by camera means such as CCD and which records the signal on a magnetic disc. Such electronic camera is increasingly used as a substitute for a conventional camera which utilizes silver salt film to record such images. With such electronic camera, the recording of a static or still image or the playback of the recorded still image can be effected in real time without requiring developing treatment which is necessary with a silver salt film of the prior art. In addition, by utilizing an image recorder such as a video tape recorder, a moving image can also be recorded. In view of a variety of uses which are possible with such an electronic camera, it will be appreciated that it is highly desirable to allow only necessary components, which depends on the intended use, to be combined in reducing the size and weight and providing an ease of operation. To meet such need, the applicant has previously proposed a detachable unit electronic camera which is disclosed in Japanese Laid-Open Patent Application No. 182,964/1983 comprising an electronic camera body and a unit which is detachably mounted on the body, the unit being electrically connected with the body by electrical interconnecting means. Record/playback means is contained within the detachable unit to enable a recording or playback of image information which is supplied from the body. While this electronic camera permits a reduction in the size and weight as compared with a camera of an integral construction, it still leaves something to be desired in respect of the ease of operation and individual operational features.

One of the inconveniences which the disclosed camera suffers relates to a viewfinder which is used to view an image of an object being recorded. As is well recognized, a viewfinder may be either optical or electronic in nature. The electronic camera having the detachable unit may include an optical viewfinder which is integrally disposed within the unit that includes a photographing optical system. Alternatively, an electronic viewfinder may be associated with the unit including the photographing optical system, but which is not provided with an optical viewfinder. Thus, either an optical or an electronic viewfinder cannot be selectively coupled to the unit which includes the photographing optical system, failing to meet the particular need of intended uses.

An electronic camera of the kind described internally houses a battery of a small capacity which is disposed within the body, the battery being used as a power supply in any manner of use. Accordingly, when the electronic camera is used as a video camera to permit a series of moving images to be recorded in a video tape recorder, it is impossible to use a battery of a greater capacity which is contained in the video tape recorder in order to operate the electronic camera to thereby increase the useful life of the battery within the electronic camera.

On the other hand, it will be seen that considering the intended uses and the resulting combination of several different components, it is desirable to divide the electronic camera into three units including a photographing unit, a picture monitor and a picture record/playback unit, thus allowing two or three of these units to be used in combination depending on the intended use.

When the electronic camera is divided into several units in this manner, it will be seen that individual units must be provided with connectors which enable a detachable coupling between different units. In addition, the electronic camera includes a plurality of circuits such as CCD or NTSC encoder which are fed with a sync signal delivered by a single sync signal generator. When these circuits are distributed among a plurality of units, it will be seen that there must be provided some means which supply a sync signal to drive those units coupled together which do not include a sync signal generator, thus requiring the provision of another sync signal generator. However, the provision of a sync signal generator in each individual unit is unfavorable in view of the space requirement and for economic reasons.

One solution will be the provision of a sync signal generator externally of these units and to supply the sync signal to individual units as required. Fortunately, the individual units are provided with connectors as mentioned above. Accordingly, such connector may be advantageously utilized to supply the sync signal to each unit.

OBJECT AND SUMMARY OF THE INVENTION

It is a first object of the invention to divide an electronic camera into three detachable units including a photographing unit, a record/playback unit and a picture monitor so as to enable them to be coupled together as a minimum combination to permit the four manners of use of the camera as "electronic camera having the record/playback capability", "devoted playback unit", "video camera" and "electronic camera for devoted recording use", and to provide a picture monitor unit of the detachable unit electronic camera which is capable of directly receiving signals to be recorded (luminance signal and color difference signals) from the electronic camera or outputs from a magnetic playback head to drive a picture display such a CRT or liquid crystal display.

It is a second object of the invention to provide a detachable unit electronic camera which allows an optical and an electronic viewfinder to be selectively mounted thereon, thus accommodating a broad range of intended uses.

It is a third object of the invention to construct an electronic camera in a plurality of units, and to provide a connector for such detachable unit electronic camera which enables a detachably coupling between different units and which supplies a sync signal to the electrical circuits within the individual units.

It is a fourth object of the invention to provide a detachable unit electronic camera which is divided into a plurality of units which can be detachably coupled together and which is fed from a battery unit, that can be replaced by a power supply associated with an external equipment such as video tape recorder whenever the latter is connected to the electronic camera.

It is a fifth object of the invention to provide an electronic camera incorporating a magnetic recording disc and which is divided into three detachable units including a photographing unit, a record/playback unit and a picture monitor unit, with the record/playback unit having a dubbing capability which may be combined with a devoted dubbing unit to enable a dubbing operation.

In accordance with the invention, the electronic camera may be used in one of the several manners including "electronic camera having the record/playback capability", "devoted playback unit", or "video camera". In such instance, a required minimum number of units may be selectively coupled together, affording a great convenience in use. The capability and the ease of operation of the picture monitor unit are enhanced, removing the drawbacks of the prior art in this respect and providing the extendability of the system.

In addition, the picture monitor unit is capable of directly receiving the luminance signal and the color difference signals both during the recording and the playback operation to provide a display of the picture. In this manner, the arrangement of the photographing unit and the record/playback unit can be simplified.

In the electronic camera of the invention, either an optical or an electronic viewfinder can be selectively mounted on the body of the electronic camera, thus accommodating for an extended range of uses. By way of example, when it is desired to minimize the dissipation of the battery or to reduce the size, the optical viewfinder may be mounted on the body. On the other hand, when a playback capability is required or when a color balance of the recorded image is to be recognized, the electronic viewfinder may be mounted on the body.

In addition, each of the connectors which enables a coupling between individual units internally houses a sync signal generator to permit the size of each unit to be minimized. This contributes to the implementation of the detachable unit electronic camera which allows a minimum member of units required to be combined depending on the intended use.

The power for the electronic camera of the invention is derived from a small battery which is coupled to the electronic camera when the electronic camera is used alone. In a manner of use in which the electronic camera is combined with external equipment such as a VTR, the electronic camera is fed from a power supply of a greater capacity which is associated with the external equipment, thus allowing the useful life of the small battery coupled to the electronic camera to be increased advantageously.

The use of a mechanical switch or an electrical switch circuit which switches between the small battery and the external power supply is avoided, thus eliminating or minimizing the resulting failure rate.

The electronic camera of the invention includes a dubbing unit which is provided as a simple and inexpensive arrangement, using a minimum number of components required, and which affords a greater convenience in use and extending the applicability of the electronic camera while retaining the combination capability thereof.

BRIEF DESCRIPTION OF THE DRAWINGS

FIG. 8 is a perspective view of a connector which is used in an electronic camera according to a second embodiment of the invention;

FIG. 9 is a perspective view of a relay connector used in a detachable unit electronic camera according to the second embodiment of the invention;

FIG. 10 is a wiring diagram of the connector shown in FIG. 8;

FIG. 11 is a wiring diagram of the connector shown in FIG. 9;

FIG. 13 is a circuit diagram of the electrical circuit of a devoted playback unit which is defined by coupling the record/playback unit and the picture monitor unit of the electronic camera shown in FIG. 12;

DETAILED DESCRIPTION OF PREFERRED EMBODIMENTS

Figure 1:
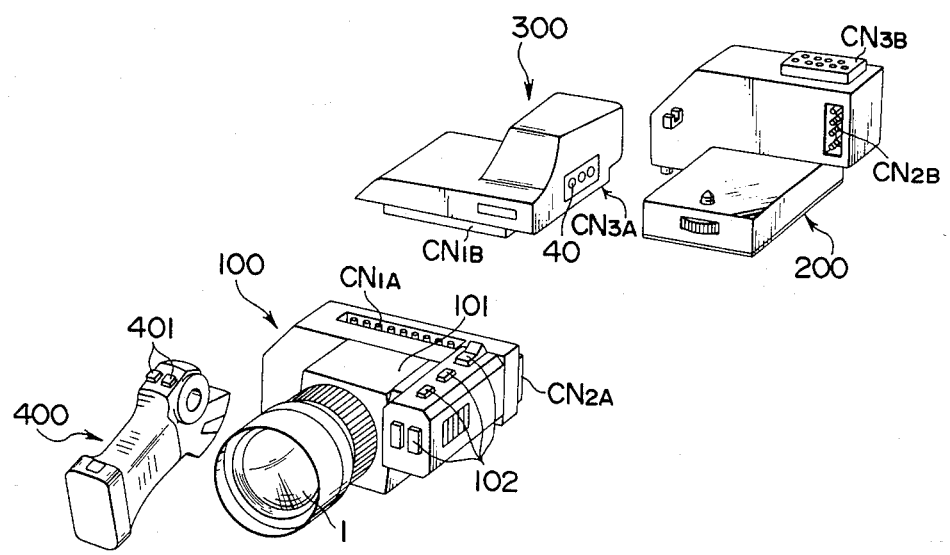
FIG. 1 is an exploded, perspective view of a detachable unit electronic camera according to a first embodiment of the invention.

Referring to the drawings, several embodiments of the invention will now be described. Referring to FIG. 1, there is shown a detachable unit electronic camera according to the invention including a photographing unit 100, a record/playback unit 200 and a picture monitor unit 300 which may be selectively coupled together in a combination. A taking lens 1 is mounted on the front surface of the photographing unit, the top of which is provided with a mount 101 for an associated optical viewfinder 500 (see FIGS. 4 and 7) to be described later. The mount 101 is normally covered, and can be opened when the optical viewfinder 500 is to be mounted. Both the top surface and a back surface of the photographing unit 100 are formed with substantially elongate angular recesses in which connectors CN1A, CN2A are disposed which allow an electrical interconnection with the record/playback unit 100 and the picture monitor unit 300 when the latter are coupled. Along one lateral side, the unit 100 carries a group of operating buttons 102, while a grip 400 having operating buttons 401 may be detachably mounted on the unit along the other lateral side thereof.

The record/playback unit 200 is adapted to be closely mounted against the bottom and the back surface of the photographing unit 100. In its front and top surfaces, the unit 200 is formed with recesses in which connectors CN2B, CN3B are disposed for electrical interconnection, the connector CN2B mating with the connector CN2A. The picture monitor unit 300 is adapted to be detachably coupled with the top surface of the photographing unit 100 and with the top surface of the record/playback unit 200, and is provided with a recess in its bottom surface in which connectors CN1B, CN3A are disposed for electrical interconnection with the connectors CN1A, CN3B, respectively. On its lateral side, the unit 300 carries a set of output terminals 40 (see FIG. 3) from which an NTSC color video signal is derived. When the units 100, 200 and 300 are coupled together, the various connectors are electrically interconnected as pairs CN1A and CN1B, CN2A and CN2B, and CN3A and CN3B, thus achieving an electrical and a mechanical coupling between the various units (see FIG. 2).

Figure 2:
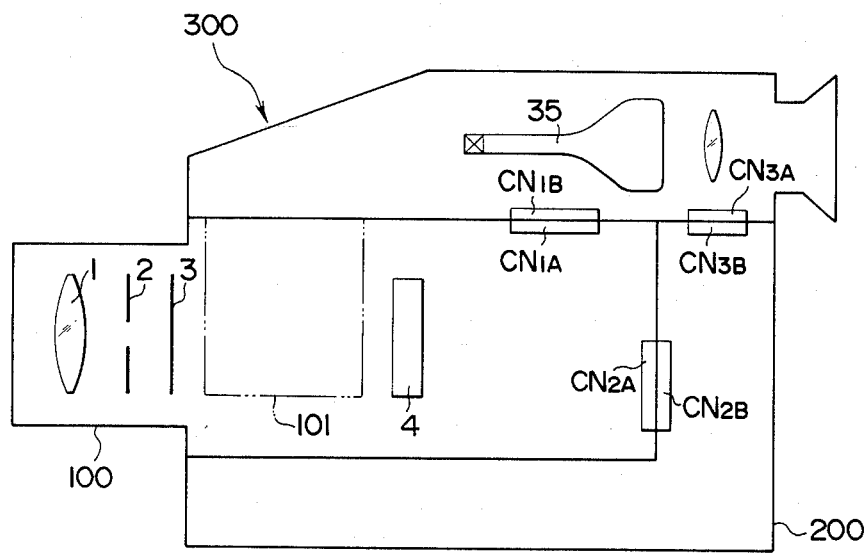
FIG. 2 is a schematic view of the electronic camera shown in FIG. 1 as assembled.
Figure 3:
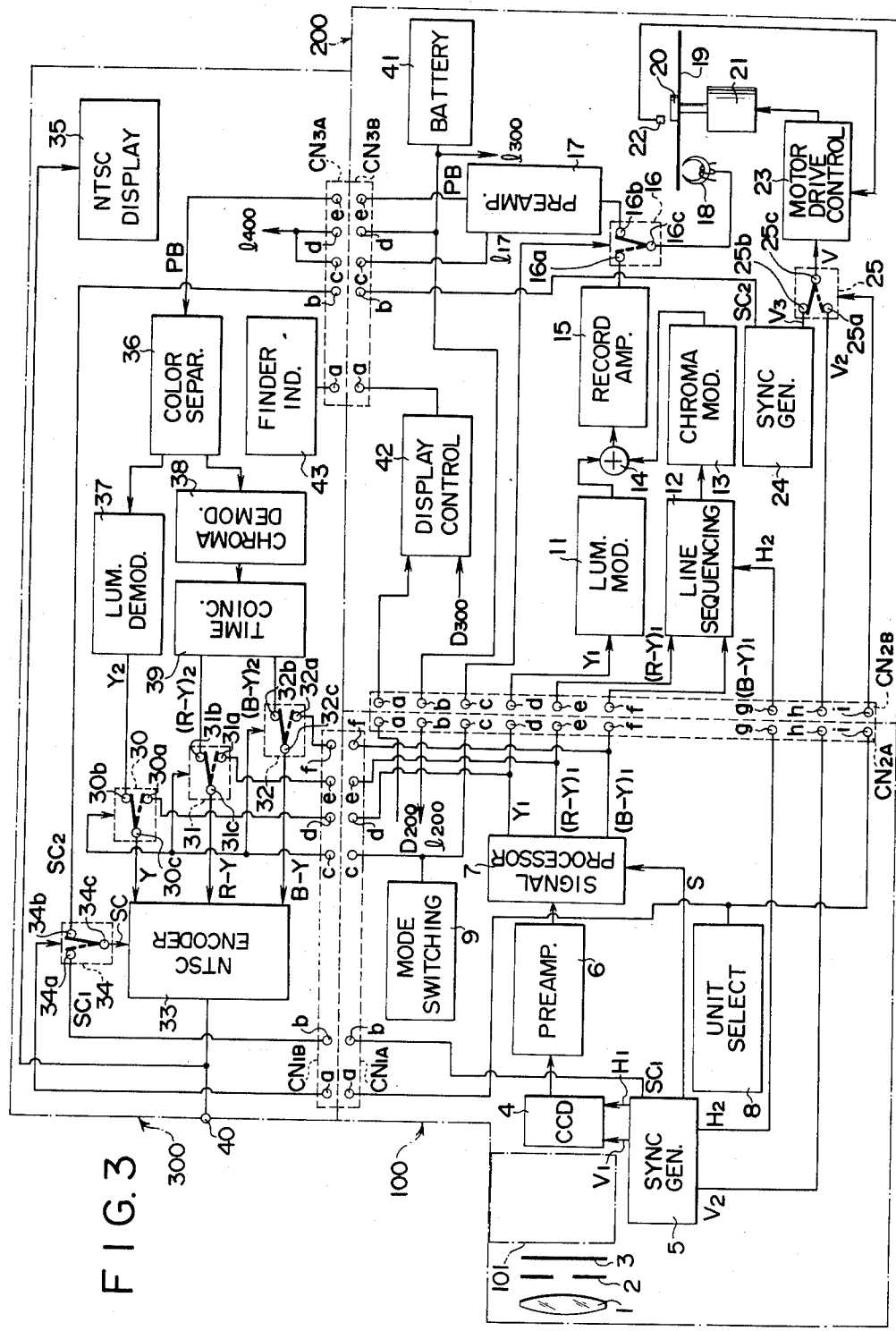
FIG. 3 is a circuit diagram of various electrical circuits contained in individual units of the detachable unit electronic camera shown in FIGS. 1 and 2.

As shown in FIGS. 2 and 3, the taking lens 1 of the photographing unit 100 functions to focus an image of an object being photographed, and an iris 2 and a shutter 3 are disposed along the optical path of the taking lens 1. Disposed on the imaging plane of the taking lens 1 is camera means, for example, CCD4, which converts a light image into a two dimensional array of electrical signals. A space 101 is defined between the taking lens 1 and the CCD4 for receiving a half mirror 501 of an optical viewfinder 500 (see FIG. 4) which can be detachably coupled to the photographing unit 100. As shown in FIG. 3, a two dimensional scanning of CCD4 takes place in response to a horizontal scan drive signal $H_1$ and a vertical scan drive signal $V_1$ which are fed from a sync signal generator 5. The output of CCD4 is coupled through a preamplifier 6 to the input of a signal processing circuit 7.

In response to an output signal from CCD4 and sync signals S from the sync signal generator 5, the signal processing circuit 7 produces a luminance signal $Y_1$ and color difference signals $(R-Y)_1$ and $(B-Y)_1$ $Y_1$ signal output from the circuit 7 is connected to a terminal d of the connector CN2A, $(R-Y)_1$ signal output is connected to a terminal e of the connector CN2A and $(B-Y)_1$ signal output is connected to a terminal f of the connector CN2A. It will be noted that these terminals d, e and f are also connected to corresponding terminals d, e and f of the connector CN1A. The combination of CCD4, preamlifier 6 and signal processing circuit 7 together constitute a camera circuit.

The unit 100 also includes a unit select signal generator 8, the output of which is connected to a terminal a of the connector CN1A and to a terminal i of the connector CN2A. The connector CN2A includes a terminal a which is adapted to receive various display data $D_{200}$ such as an exposure period which is to be used within the unit 100, and also includes a terminal b which is connected to a supply bus $l_{200}$ which feeds the various circuits disposed within the unit 100. The generator 8 develops a signal of H level when the bus $l_{200}$ assumes a given voltage. Additionally, the unit 100 includes a mode switching circuit 9, the output of which is connected to a terminal c of the connector CN1A and to a terminal c of the connector CN2A. The circuit 9 produces an output which changes its level in accordance with a record mode or a playback mode which may be established by a manual switch, not shown. Specifically, when the record mode is established, the output assumes an H level, and when the playback mode is established, the output assumes an L level. An output terminal of the generator 5 which delivers a horizontal sync signal $H_2$ is connected to a terminal g of the connector CN2A while an output terminal which delivers a vertical sync signal $V_2$ is connected to a terminal h of the connector CN2A. Finally, the output terminal of the generator 5 which delivers a subcarrier signal $SC_1$ is connected to a terminal b of the connector CN1A.

The connector CN2B of the record/playback unit 200 includes a terminal d which is connected to the input of a luminance signal modulator 11, a terminal e which is connected to $(R-Y)_1$ signal input of a line sequencing circuit 12, and a terminal f which is connected to $(B-Y)_1$ signal input of the circuit 12. The output of the circuit 12 is coupled through a chroma signal modulator 13 to one input of a summing circuit 14, the other input of which is connected to the output of the luminance signal modulator 11. The output of the summing circuit 14 is coupled through a record amplifier 15 to a normally off terminal 16a of a switch circuit 16, which also includes a normally on terminal 16b which is in turn connected through a preamplifier 17, forming a playback circuit, to a terminal e of the connector CN3B. The combination of the circuits 11 to 15 constitutes together a recording circuit.

The preamplifier 17 has a supply input which is connected through a line $l_{17}$ to a terminal c of the connector CN3B. The switch circuit 16 has a common terminal 16c which is connected to a magnetic recording/playback head 18. It is to be understood that the magnetic head 18 is supported by an actuator, not shown, so as to be movable in the radial direction of a magnetic disc 19. The disc 19 is centrally formed with a chucking, which allows the disc to be mounted on a motor 21. The chucking is formed with a pulse generator yoke (hereafter abbreviated as PG yoke 20). A detecting coil 22 is disposed adjacent to the chucking to detect the location of the PG yoke 20, and is connected to one control input of a motor drive control circuit 23, a control output of which is fed to the motor 21.

Also the unit 200 includes a sync signal generator 24 having an output terminal which delivers a vertical sync signal $V_3$ which is connected to a normally on terminal 25b of a switch circuit 25. The circuit 25 has a normally off terminal 25a which is connected to a terminal h of the connector CN2B. The circuit 25 has a common terminal 25c which is connected to the other control input of the motor drive control circuit 23. An output terminal of the sync signal generator 24 which delivers a subcarrier signal $SC_2$ is connected to a terminal b of the connector CN3B. The connector CN2B includes a terminal i which is connected to the control input of the switch circuit 25, a terminal g which is connected to an input terminal for the horizontal sync signal $H_2$ of the line sequencing circuit 12, and a terminal c which is connected to the control input of the switch circuit 16.

The unit 200 contains a battery 41 which serves as a power supply, and its output terminal is connected to a supply bus $l_{300}$ which feeds various circuits within the unit 200 other than the preamplifier 17 and to a terminal d of the connector CN3B and to a terminal b of the connector CN2B. The unit 200 also includes a display control circuit 42 having a first data input connected to a terminal a of the connector CN2B, and a second data input to which various display data $D_{300}$ such as data indicating the number of recorded tracks and operational mode is supplied. The output of the display control circuit 42 is connected to a terminal a of the connector CN3B.

The picture monitor unit 300 which is adapted to be coupled to other units of the electronic camera has an electronic viewfinder (NTSC display) 35. The connector CN1B of the unit 300 includes terminals d, e and f, which are connected to normally off terminals 30a, 31a, and 32a, respectively, of switch circuits 30, 31, and 32, common terminals 30c, 31c, and 32c of which are connected to Y signal input, R−Y signal input and B−Y signal input, respectively, of an NTSC encoder 33. The encoder 33 has a terminal to which a subcarrier signal SC is supplied and which is connected to the common terminal 34c of a switch circuit 34 having a normally off terminal 34a which is connected to a terminal b of the connector CN1B and a normally on terminal 34b which is connected to a terminal b of the connector CN3A. The circuit 34 has a control terminal which is connected to a terminal a of the connector CN1B. The output of the NTSC encoder 33 is connected to an NTSC video output terminal 40 and to an input of an NTSC display 35 which comprises a CRT.

The connector CN3A includes a terminal e which is connected to the input of a color separation circuit 36. The circuit 36 has an output terminal from which a luminance signal component is delivered and which is coupled through a luminance signal demodulator 37 to feed the $Y_2$ signal to a normally on terminal 30b of the switch circuit 30. The color separation circuit 36 has another output terminal from which a chroma signal component is delivered and which is coupled through a chroma signal demodulator 38 to the input of a time coincidence circuit 39. The circuit 39 functions to achieve a time coincidence of the R−Y signal and the B−Y signal which are inputted in a line sequential manner, in a manner well known in the art. The circuit 39 has an output terminal from which the $(R-Y)_2$ signal is delivered and which is connected to a normally on terminal 31b of the switch circuit 31, and also has another output terminal from which the $(B-Y)_2$ signal is delivered and which is connected to a normally on terminal 32b of the switch circuit 32. The control terminals of the switch circuits 30, 31, 32 are connected in common and connected to a terminal c of the connector CN1B. The unit 300 also includes a finder indicator 43 which is located adjacent to the NTSC display 35 and which has an input terminal connected to a terminal a of the connector CN3A. The connector CN3A also includes a terminal d which is connected to a supply bus $l_{400}$ which feeds the various circuits within the unit 300. The terminals e and d of the connector CN3A are connected in common to feed the preamplifier 17 in the playback circuit.

The operation of the electronic camera mentioned above will now be described. In the present embodiment, the individual units 100, 200 and 300 can be coupled together in four different combinations as indicated below:

(1) The three units 100, 300 and 200 may be coupled together to use the combination as an electronic camera capable of recording and playback operation.

(2) The units 200 and 300 may be coupled together to use the combination as a devoted playback unit.

(3) The units 100 and 300 may be coupled together to use the combination as a video camera.

(4) The units 100 and 200 may be coupled together to use the combination as an electronic camera which is for devoted use in the recording operation. In this instance, it is necessary to employ the optical viewfinder 500 to monitor the picture being taken.

The operation for use in the manner (1) will now be described with reference to FIG. 3. In this instance, the terminals a to f of the connector CN1A are electrically connected to the terminals a to f of the connector CN1B, respectively, as are the terminals a to i of the connectors CN2A, CN2B and the terminals a to e of the connectors CN3A, CN3B. In addition, the units 100, 200, 300 are physically coupled together with the grip 400.

When a power switch, not shown, is closed, the voltage across the battery 41 is applied to the preamplifier 17 through a path including the bus $l_{300}$, the terminals d of the connectors CN3B, CN3A, the terminals d, c of the connector CN3A, the terminals c of the connector CN3B and the line $l_{17}$. At the same time, the various circuits within the unit 200 are fed from the bus $l_{300}$, and the various circuits within the unit 300 are fed from the bus $l_{400}$. In addition, the various circuits within the unit 100 are fed from the battery 41 through the terminals b of the connectors CN2B, CN2A and the bus $l_{200}$.

If it is now assumed that a switch or the like is used to establish a record mode, the mode switching circuit 9 develops an output of H level, which is applied through the terminals c of the connectors CN1A, CN1B to the switch circuits 30, 31, 32, and is also fed through the terminals c of the connectors CN2A, CN2B to activate the switch circuit 16. As the photographing unit 100 is fed with power, the unit select signal generator 8 develops an output of H level, which is applied to the switch circuit 34, through the terminals c of the connectors CN1A, CN1B, to activate it, and is also fed through the terminals a of the connectors CN2A, CN2B to activate the switch circuit 25. Accordingly, each of the switch circuits 16, 25, 30, 31, 32, 34 are operated to establish a connection between the common terminal and the normally off terminal thereof.

Under this condition, the shutter 3 is open, and accordingly, an image of an object being photographed is focussed by the taking lens 1 upon the light incident surface of CCD4. The amount of incident light upon CCD4 is controlled by the iris 2. The image focussed on CCD4 is subject to a two dimensional scan which takes place in response to the horizontal scan drive signal $H_l$ and the vertical scan drive signal $V_l$ which are supplied from the sync signal generator 5, thus producing an electrical signal which corresponds to the image, at the output of CCD4. This signal is amplified to a given level by the preamplifier 6 and thence fed to the signal processing circuit 7 which then produces $Y_1$ signal, $(R-Y)_1$ signal and $(B-Y)_1$ signal in response to the sync signal S also fed from the sync signal generator 5. These three signals are fed through the terminal pairs d, e and f of the connectors CN1A, CN1B to the picture monitor unit 300. These signals are then fed through the switch circuits 30, 31, 32 to be input to the NTSC encoder 33, which then operates to produce a color video signal in accordance with the given NTSC standard in response to the subcarrier signal $SC_1$ which is delivered from the sync signal generator 5 and fed through the terminals b of the connectors CN1A, CN1B and the switch circuit 34. The video signal is applied to the output terminal 40, and is also applied to the NTSC display 35 which then displays the picture corresponding to the image focussed upon CCD4. At the same time, display data $D_{200}$ such as an exposure period which is determined within the unit 100 as well as display data $D_{300}$ such as the number of recorded tracks which is determined within the unit 200 are fed to the display control circuit 42, the output of which is fed through the terminals a of the connectors CN3B, CN3A to the finder indicator 43, which then indicates such data.

Under this condition, a distance adjustment and an adjustment of the focal length of the taking lens 1 as well as the set-up of the photographic composition are made while visually observing the display 35. A release button, not shown, is then operated, whereupon the picture which is displayed by the display 35 is recorded. Specifically, the recording operation takes place as follows: As the release button is operated, the shutter 3 is closed once, and subsequently an exposure of CCD4 takes place during a given exposure period. At the same time as the exposure, a two dimensional scanning of CCD4 takes place in response to the horizontal scan drive signal $H_1$ and the vertical scan drive signal $V_1$ fed from the sync signal generator 5. An output signal from CCD4 is amplified by the preamplifier 6 and is then input to the signal processing circuit 7. The circuit 7 develops at its output $Y_1$ signal, $(R-Y)_1$ signal and $(B-Y)_1$ signal, which are delivered through the terminal pairs d, e and f of the connectors CN2A, CN2B. $Y_1$ signal is subject to an emphasis by the luminance signal modulator 11, which then applies a frequency modulation.

The $(R-Y)_1$ signal and $(B-Y)_1$ signal are then converted into a chroma signal in which the $(R-Y)_1$ signal and $(B-Y)_1$ signal occur for each horizontal scan line, by the operation of the line sequencing circuit 12 which responds to the horizontal sync signal $H_2$ fed from the sync signal generator 5. The chroma signal is then subject to an FM modulation and an emphasis by the chroma signal modulator 13. The summing circuit 14 mixes the output signals from the luminance signal modulator 11 and the chroma signal modulator 13, and the mixed output is fed to the record amplifier 15. The amplifier 15 performs various processing such as a record equalization and white peak clipping, and then the resulting signal is fed through the switch circuit 16 to the magnetic head 18 for recording.

The vertical sync signal $V_2$ from the sync signal generator 5 is fed through the terminal pair h of the connectors CN2A, CN2B and through the switch circuit 25 to the other control input of the motor drive control circuit 23 as a vertical sync signal V. Accordingly, the motor 21 rotates at a rate of one revolution per period (1/60 second) of the vertical sync signal $V_2$. In this manner, the magnetic disc 19 is driven for rotation while maintaining a phase control of the relative position of the disc with respect to the magnetic head 18 which is accomplished by the signal from the detecting coil 22 which develops a signal indicating the position of the PG yoke 20. In this manner, a magnetic recording is achieved as referenced to the position of the PG yoke 20.

When a signal which is previously recorded on the magnetic disc 19 is reproduced, a switch, not shown, may be operated to change the output from the mode switching circuit 9 from its H level to its L level. Thereupon, the switch circuits 16, 30, 31, 32 are deactivated, whereupon each of these switches return to their positions in which the common terminal is connected to the normally on terminal. The rotation of the magnetic disc 19 is controlled in the same manner as it occurred during the recording operation, whereby a reproduced signal from the magnetic head 18 is fed through the switch circuit 16 to the preamplifier 17, which amplifies it to a given level while simultaneously performing a playback equalization and deemphasis, thus producing a reproduced signal PB.

The reproduced signal PB is fed through the terminals e of the connectors CN3B, CN3A to the picture monitor unit 300. In this unit, the reproduced signal PB is separated into the luminance signal component and the chroma signal component by the color separation circuit 36. The luminance signal component is demodulated by the luminance signal demodulator 37 which also performs a deemphasis, thus producing $Y_2$ signal, which is fed through the switch circuit 30 to the NTSC encoder 33. The chroma signal component is demodulated by the chroma signal demodulator 38 which also performs a given deemphasis, thus producing concurrent $(R-Y)_2$ and $(B-Y)_2$ signals. $(R-Y)_2$ signal is fed through the switch circuit 31, and $(B-Y)_2$ signal is fed through the switch circuit 32, both being inputted to the NTSC encoder 33 as $(R-Y)$ and $(B-Y)$ signals. The encoder 33 responds to the subcarrier signal SC which is delivered from the sync signal generator 5 and fed through the terminal pair b of the connectors CN1A, CN1B and through the switch circuit 34 to develop a given NTSC color video signal. The video signal is then applied to the output terminal 40 and is also fed to the NTSC display 35 which displays the reproduced image corresponding to the signal recorded on the magnetic head 19. As before, display data $D_{200}$, $D_{300}$ such as the exposure period or the number of recorded tracks are indicated by the finder indicator 43.

Figure 5:
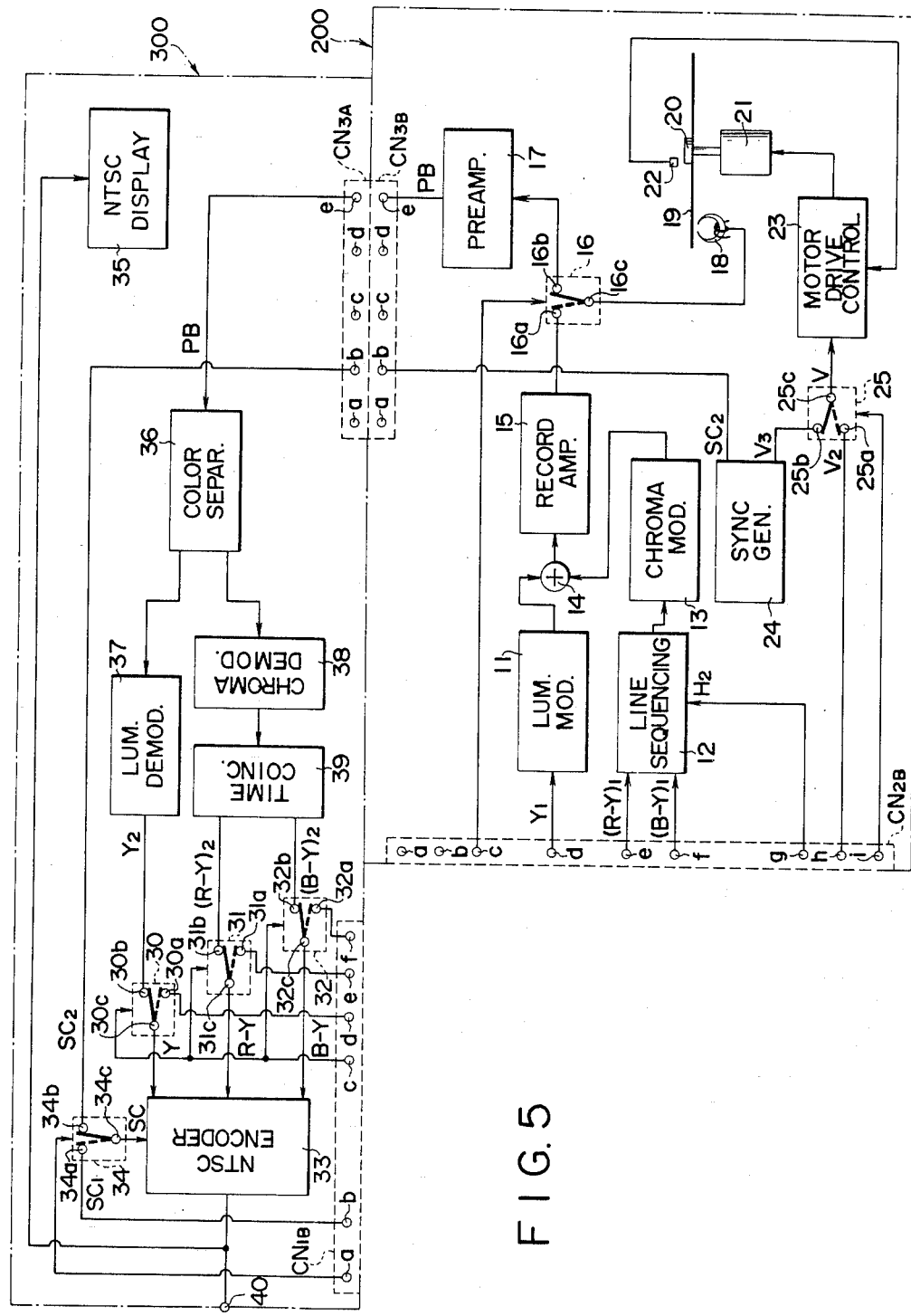
FIG. 5 is a block diagram of a devoted playback unit defined by coupling the record/playback unit and the picture monitor unit of the electronic camera shown in FIGS. 1 and 2.

The operation of the electronic camera in the manner (2) mentioned above, namely, when it is used as a devoted playback unit by coupling the record/playback unit 200 and the picture monitor unit 300 together, will now be described. In this instance, an H level signal from the unit select signal generator 8 (see FIG. 3) is not applied to the terminal a of the connector CN1B and to the terminal i of the connector CN2B, as will be noted from FIG. 5, and hence the switch circuits 25, 34 remain deactivated, whereby the common terminal and the normally on terminal of each of these switch circuits 25, 34 are connected together as shown by solid line. A signal from the mode switching circuit 9 (see FIG. 3) is not applied to the terminal c of the connector CN1B and to the terminal c of the connector CN2B, and hence the switch circuits 16, 30, 31, 32 remain deactivated, and accordingly, in each of these switch circuits, a connection is established between the common terminal and the normally on terminal as indicated by solid line. Therefore, the rotation of the motor 21 is controlled in accordance with the vertical sync signal $V_3$ delivered by the sync signal generator 24 which is contained in the record/playback unit 200, in distinction from the manner (1) mentioned above.

The signal previously recorded on the magnetic disc 19 is reproduced in the same manner as the playback mode of the manner (1), and $Y_2$, $(R-Y)_2$ and $(B-Y)_2$ signals are fed through the switch circuits 30, 31, 32 to be inputted to the NTSC encoder 33. It is to be noted that the subcarrier signal SC which is input to the encoder 33 is the subcarrier signal $SC_2$ from the sync signal generator 24 within the record/playback unit 200 which is fed through the terminal pair b of the connectors CN3B, CN3A and the switch circuit 34, in distinction to that of the manner (1). The encoder 33 produces an NTSC color video signal while using the subcarrier signal $SC_2$, and a video signal is applied to the output terminal 40 and also supplied to the NTSC display 35 which allows an image reproduced from the signal recorded on the magnetic disc 19 to be displayed. When it is desired to record such reproduced image in separate equipment, for example, a video tape recorder, a video input of such video tape recorder may be connected to the output terminal 40 of the picture monitor unit 300. When the reproduced image is to be displayed on a large size picture monitor television set, a video input of such set may be connected to the output terminal 40. In this manner, an output available at the output terminal 40 can be utilized in various ways.

The operation of the electronic camera in the manner (3) mentioned above, namely, when the photographing unit 100 and the picture monitor unit 300 are coupled together to operate as a video camera, will now be described with reference to FIG. 6. An H level output from the unit select signal generator 8 activates the switch circut 34, whereby the common terminal 34c is connected to the normally off terminal 34a as indicated by broken lines. When a switch, not shown, is used to establish a record mode, the mode switching circuit 9 produces an output of H level, which activates the switch circuits 30, 31, 32. Accordingly, the common terminal is connected to the normally off terminal of each of these circuits.

Accordingly, a picture corresponding to an image of an object being photographed is displayed by the NTSC display 35 in the same manner as it occurs during the record mode of the manner (1) mentioned above. The output terminal 40 now delivers the NTSC color video signal, and hence such terminal may be connected to a video input of a video tape recorder, not shown, thus allowing a motion picture to be recorded.

Figure 4:
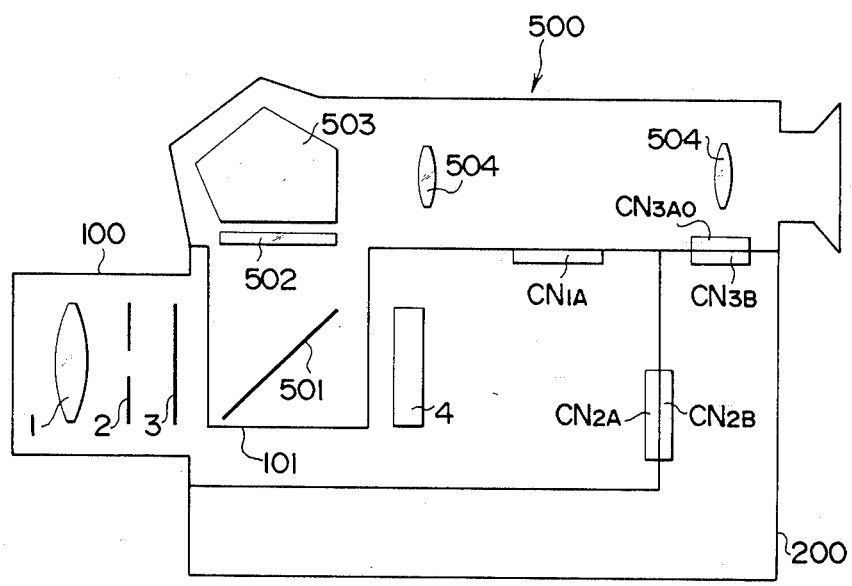
FIG. 4 is a schematic view of the electronic camera shown in FIGS. 1 and 2 in which an optical viewfinder is substituted for the picture monitor unit thereof.
Figure 7:
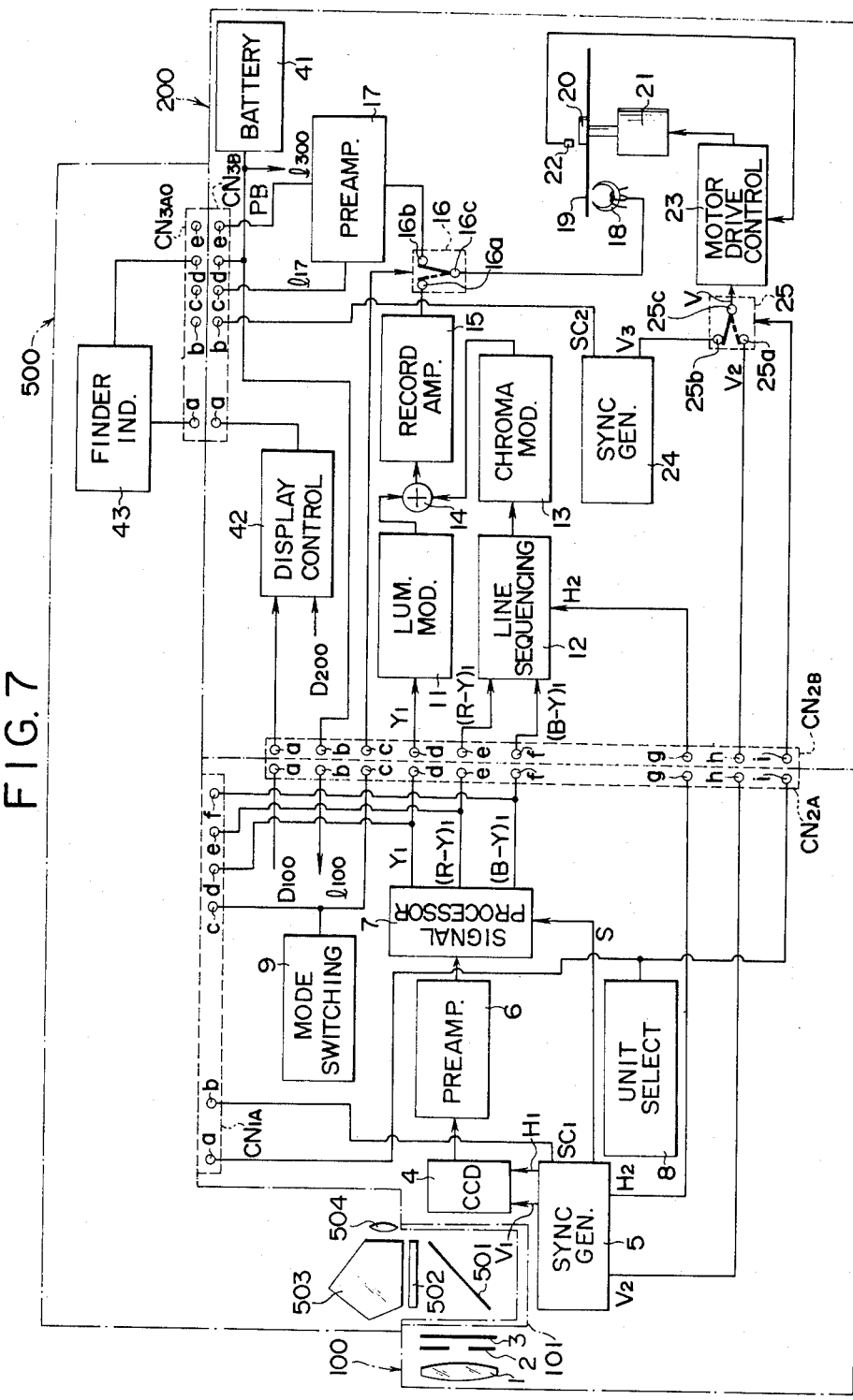
FIG. 7 is a circuit diagram of the electrical circuit of the electronic camera shown in FIG. 4 in which the photographing unit, the record/playback unit and an optical viewfinder are coupled together.

In the operation of the electronic camera in the manner (4) mentioned above, namely, when the photographing unit 100 and the record/playback unit 200 are coupled together with the optical viewfinder 500 mounted thereon to provide an electronic camera which is devoted for recording purpose, reference is made to FIGS. 4 and 7 for description. As shown, the photographing unit 100 and the record/playback unit 200 are coupled together through the connectors CN2A, CN2B, and the optical viewfinder 500 is assembled with the combination by inserting the half mirror 501 within the space 101, with a connector CN3A0 of the viewfinder 500 being coupled with the connector CN3B of the record/playback unit 200.

An H level output from the unit select signal generator 8 activates the switch 25, whereby the common terminal 25c is connected to the normally off terminal 25a as indicated by broken lines. When a switch, not shown, is used to establish the record mode, the mode switching circuit 9 develops an output of H level which activates the switch circuit 16 to connect the common terminal 16c with the normally off terminal 16a, as indicated by broken lines.

It is to be noted that terminals c and d of the connector CN3A0 are not connected together, preventing the output from the battery 41 from being supplied to the line $l_{17}$ and hence to the preamplifier 17, thus preventing a wasteful power dissipation.

A picture signal is recorded on the magnetic disc 19 as it occurs during the record mode in the manner (1) mentioned above. However, in this instance, the half mirror 501 of the optical viewfinder 500 is inserted into the space 101, whereby the light flux which passed through the taking lens 1 is divided into two portions, one being fed to CCD4 and the other fed to a finder screen 502. The light which has transmitted through the half mirror 501 impinges upon CCD4 to enable a recording of a picture signal on the magnetic disc 19 in the same manner as in the manner (1) mentioned above. The light flux which is reflected upward by the half mirror 501 is focussed upon the finder screen 502 and is then converted into an erect image by a pentaprism 503, which erect image can be viewed through an eyepiece 504, thus allowing an adjustment of the focal length, a distance adjustment and the set-up of the photographic composition.

As described, with this embodiment, the units 100, 200 and 300 can be selectively coupled together. When reproducing the signal which is previously recorded on the magnetic disc 19, the signal from the head 18 is amplified by the preamplifier 17 which is located adjacent thereto before delivering it to the picture monitor unit 300, thus advantageously improving the signal-to-noise ratio. Both the photographing unit 100 and the record/playback unit 200 include the sync signal generators 5, 24, respectively. When the photographing unit 100 is used, the sync signal generator 5 included therein delivers various sync signals to both the record/playback unit 200 and the picture monitor unit 300. When the unit 100 is not used, the sync signal generator 24 in the unit 200 delivers various sync signals, which are fed to the picture monitor unit 300. In this manner, there is obtained a video signal which is free from jitters caused by the eccentricity of the magnetic disc 19 during the playback mode.

In the described examples of combination, the photographing unit 100 is provided with the space 101 in which the optical viewfinder 500 is received. However, it is to be understood that the unit 100 may be modified by removing the space 101 and avoiding the use of the viewfinder 500. Also it will be appreciated that the NTSC encoder 33 which is contained within the picture monitor unit 300 may be replaced by a PAL or SECAM encoder or other similar encoders. In addition, the shutter 3 may be located in front of the image plane such as formed by CCD4. Alternatively, instead of using the shutter means such as CCD4 may be electrically controlled. Finally, when selectively coupling the units 100, 200 and 300 in the described embodiment, the connectors CN1A, CN1B, CN2A, CN2B, CN3A and CN3B may be coupled through relay cables rather than coupling them together.

In another embodiment of the invention, the sync signals are supplied to various electrical circuits within the plurality of divided units by utilizing connectors which are originally used to enable a detachable coupling of selected units. In this embodiment, the connectors of selected units are coupled together by utilizing two kinds of relay connectors 600 or 700, shown in FIGS. 8 and 9, respectively. The relay connector 600 shown in FIG. 8 comprises a first connector 601 and a second connector 602 between which a coupler 603 is integrally connected. As shown in FIG. 10, the coupler 603 internally houses a sync signal generator 604 and a crystal oscillator 605. The other relay connector 700 comprises a first connector 701 and a second connector 702 which are integrally formed by having their electrical terminals connected in common, as indicated in FIGS. 9 and 11.

Referring to FIGS. 10 and 11, the electrical circuits of these relay connectors 600, 700 will now be described. The first connector 601 includes a plurality of terminals $a_1$ to $a_n$, +, −, b, c . . . , and the second connector 602 similarly includes a plurality of terminals $a_1$ to $a_n$, +, −, b, c . . . which are connected to corresponding terminals of the first connector by lead wires. In addition, the "+" and "−" terminals are connected across the power supply terminals of the sync signal generator 604 which is in turn connected to the crystal oscillator 605 operative to determine a reference oscillation frequency of the generator 604.

The generator 604 includes a plurality of output terminals which are connected to the terminals $a_1$ to $a_n$ of the first and the second connector 601, 602, respectively. The horizontal scan signal, the vertical scan signal, the subcarrier signal, CCD scan signal or like sync signals are applied to the terminals $a_1$ to $a_n$.

On the other hand, each of the first and the second commectors 701, 702 of the other relay conncetor 700 also includes a plurality of terminals $a_1$ to $a_n$, +, −, b, c . . . which are connected together by lead wires.

Figure 12:
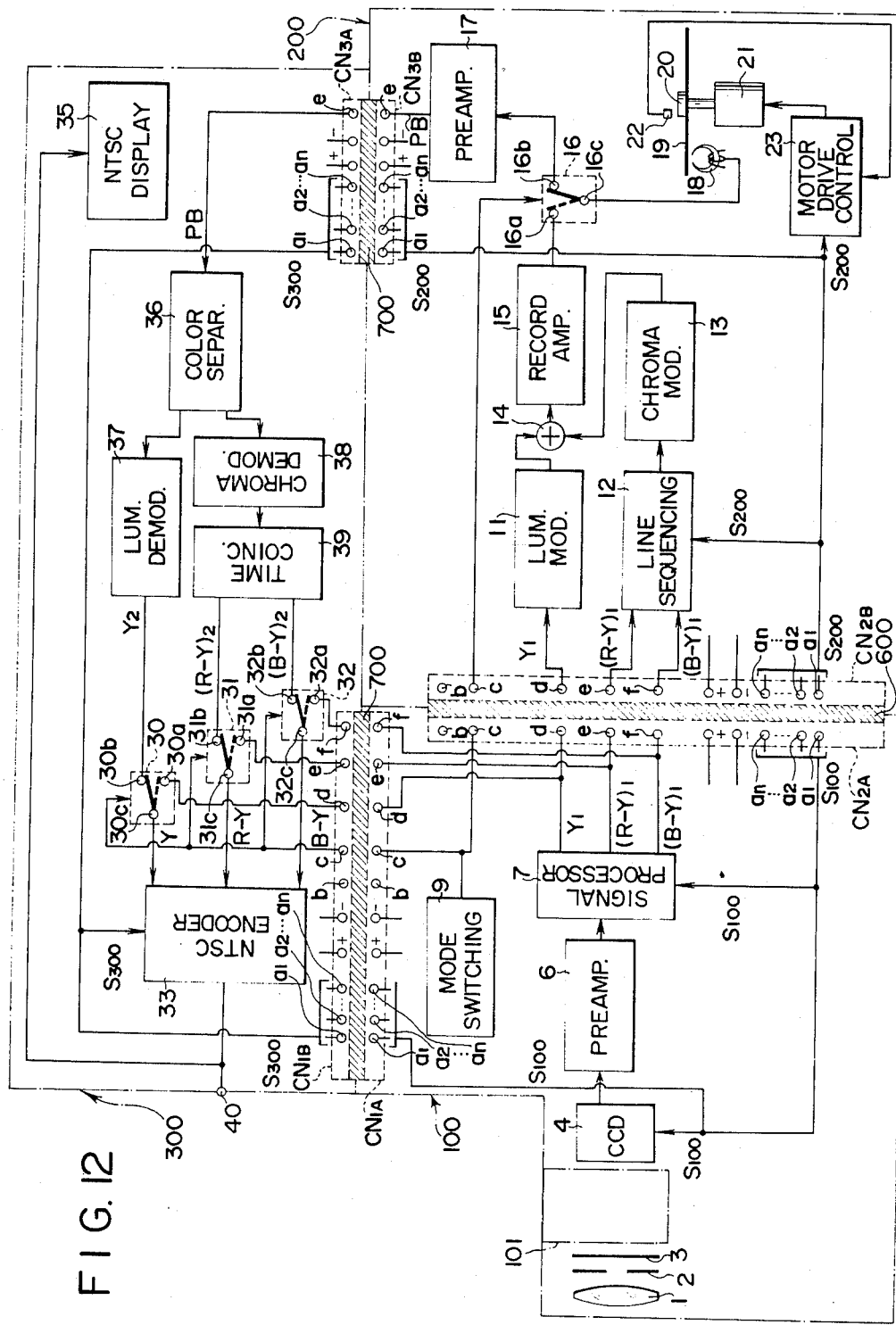
FIG. 12 is a circuit diagram of the electrical circuit within the individual units of electronic camera according to the second embodiment of the invention.

When the relay connectors 600, 700 are used with the electronic camera capable of recording and playback operation as mentioned above in connection with the manner (1) (see FIG. 3), the resulting circuit arrangement will be as shown in FIG. 12. Specifically, the terminals $a_1$ to $a_n$ and b to f of the connector CN1A are electrically connected to the corresponding terminals $a_1$ to $a_n$ and b to f of the connector CN1B, respectively, through the relay connector 700. Similarly, the terminals $a_1$ to $a_n$ and e of the connector CN3A are connected electrically to the corresponding terminals $a_1$ to $a_n$ and e of the connector CN3B through the relay connector 700. In addition, the terminals $a_1$ to $a_n$ and b to f of the connector CN2A are electrically connected to corresponding terminals $a_1$ to $a_n$ and b to f of the connector CN2B through the relay connector 600, and the terminals $a_1$ to $a_n$ of the connectors CN2A, CN2B are connected to the sync signal generator 604 of the relay connector 600. The connectors are coupled together in this manner, and the grip 400 (see FIG. 1) are physically coupled to the units 100, 200 and 300. When a power supply, not shown, is fed to the units, the terminals $a_1$ to $a_n$ of the relay connector 600 feed various sync signals to the individual units 100, 200 and 300 through sync signal lines $S_{100}$, $S_{200}$ and $S_{300}$, respectively. Accordingly, the same operation as described before takes place.

When the relay connectors 600 and 700 are used with the devoted playback unit (see FIG. 5) mentioned above in connection with the manner (2) or which comprises the record/playback unit 200 and the picture monitor unit 300 physically coupled together, there results a circuit arrangement as shown in FIG. 13. In this instance, the relay connector 600 is coupled between the connectors CN3A and CN3B in order to couple the units 200 and 300 together. Because the photographing unit 100 is not coupled, the terminal c of the connector CN1B and the terminal c of the connector CN2B remain at their L level. Accordingly, the switch circuits 30, 31, 32 and 16 remain deactivated, and in these switch circuits, the common terminal is connected to the normally on terminal as indicated by solid lines.

As a result, in distinction to the electronic camera of FIG. 12, the outputs from the sync signal generator 604 are delivered through the sync signal lines $S_{200}$, $S_{300}$, the vertical sync signal on the line $S_{200}$ driving the motor 21 for rotation through motor drive control 23. The signal which is previously recorded on the magnetic disc is separated into $Y_2$, $(R-Y)_2$ and $(B-Y)_2$ signals, which are supplied through the switch circuits 30, 31, 32, respectively, to the NTSC encoder 33 in a manner similar to that during the playback mode in the manner (1). In this instance, the subcarrier signal fed to the encoder 33 is supplied by routing the output from the sync signal generator 604 in the relay connector 600 through the terminals $a_1$ to $a_n$ of the connector CN3A and the sync signal line $S_{300}$, in distinction from the electronic camera mentioned above in connection with the manner (1). The encoder 33 produces an NTSC color video signal in response to the subcarrier signal, and such video signal is applied to the output terminal 40 and also fed to the NTSC display 35, allowing a reproduced image from the magnetic disc 19 to be displayed. As mentioned previously, the output terminal may be connected to a video input of a video tape recorder or a large size picture monitor television set whenever it is desired to record the image on a video tape recorder or when the reproduced image is to be displayed on a large size picture monitor television set.

Figure 14:
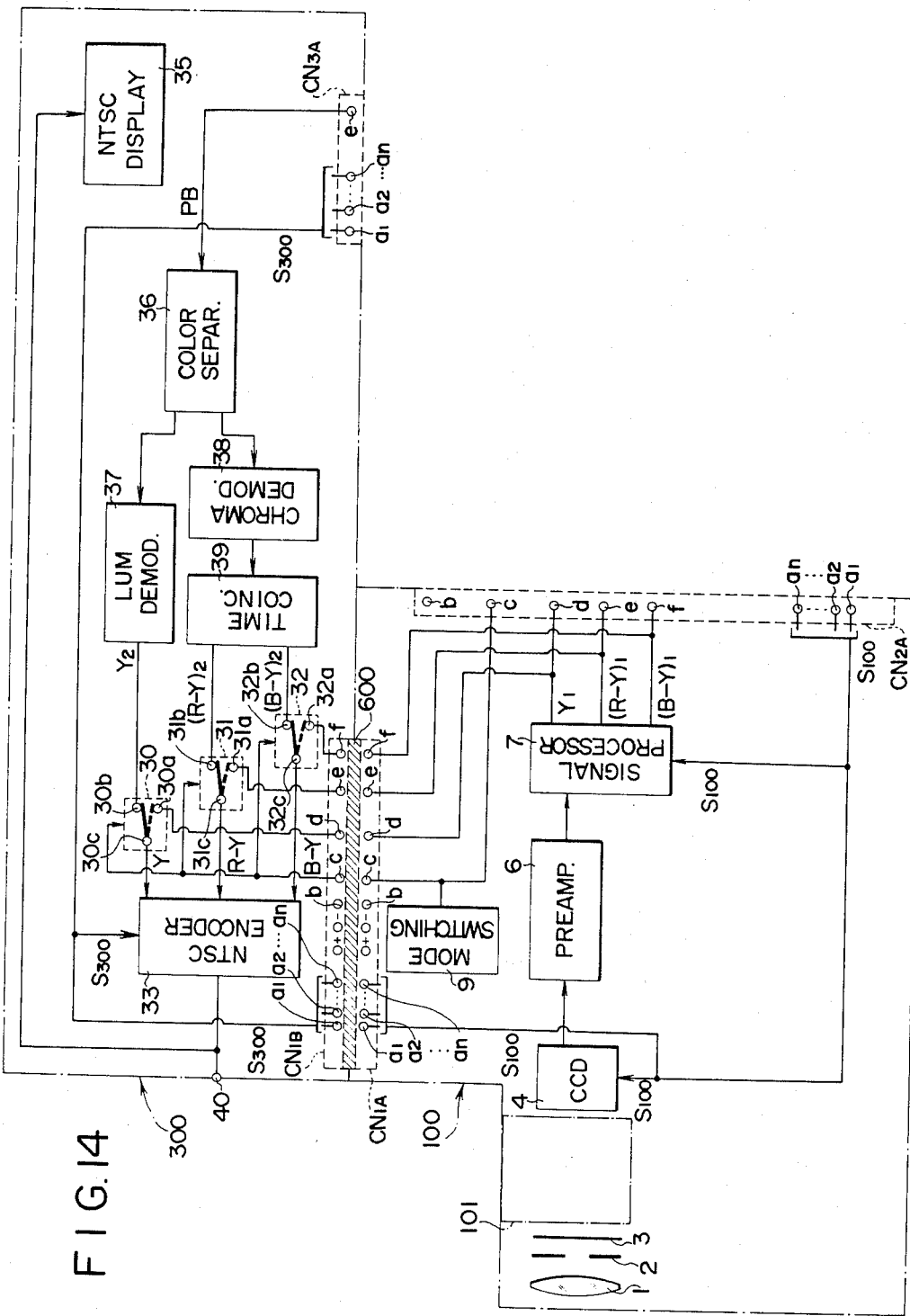
FIG. 14 is a circuit diagram of the electrical circuit of a video camera which is defined by coupling the photographing unit and the picture monitor unit of the electronic camera shown in FIG. 12.

When the connector 600 is used with the video camera (see FIG. 6) which comprises the photographing unit 100 and the picture monitor unit 300 coupled together, there results a circuit arrangement as shown in FIG. 14. In this instance, the relay connector 600 is coupled between the connectors CN1A and CN1B. Thereupon, the terminals b, c, d and f of the connectors CN1A, CN1B are connected together, and various sync signals from the sync signal generator 604 within the relay connector 600 are fed to the units 100, 300 through the terminals $a_1$ to $a_n$ and the sync signal lines $S_{100}$, $S_{300}$. When a switch, not shown, is operated to establish a record mode, the mode switching circuit 9 develops an output of H level, which activates the switch circuits 30, 31, 32. Thus, in these switch circuits, the common terminal is connected to the normally off terminal, as indicated by broken lines. Accordingly, an image corresponding to a photographic image of an object being photographed can be displayed on the NTSC display 35, in the same manner as during the record mode with the video camera of FIG. 6. The output terminal 40 delivers the NTSC color video signal, which may be fed to a video tape recorder, not shown, for recording a motion picture.

Figure 15:
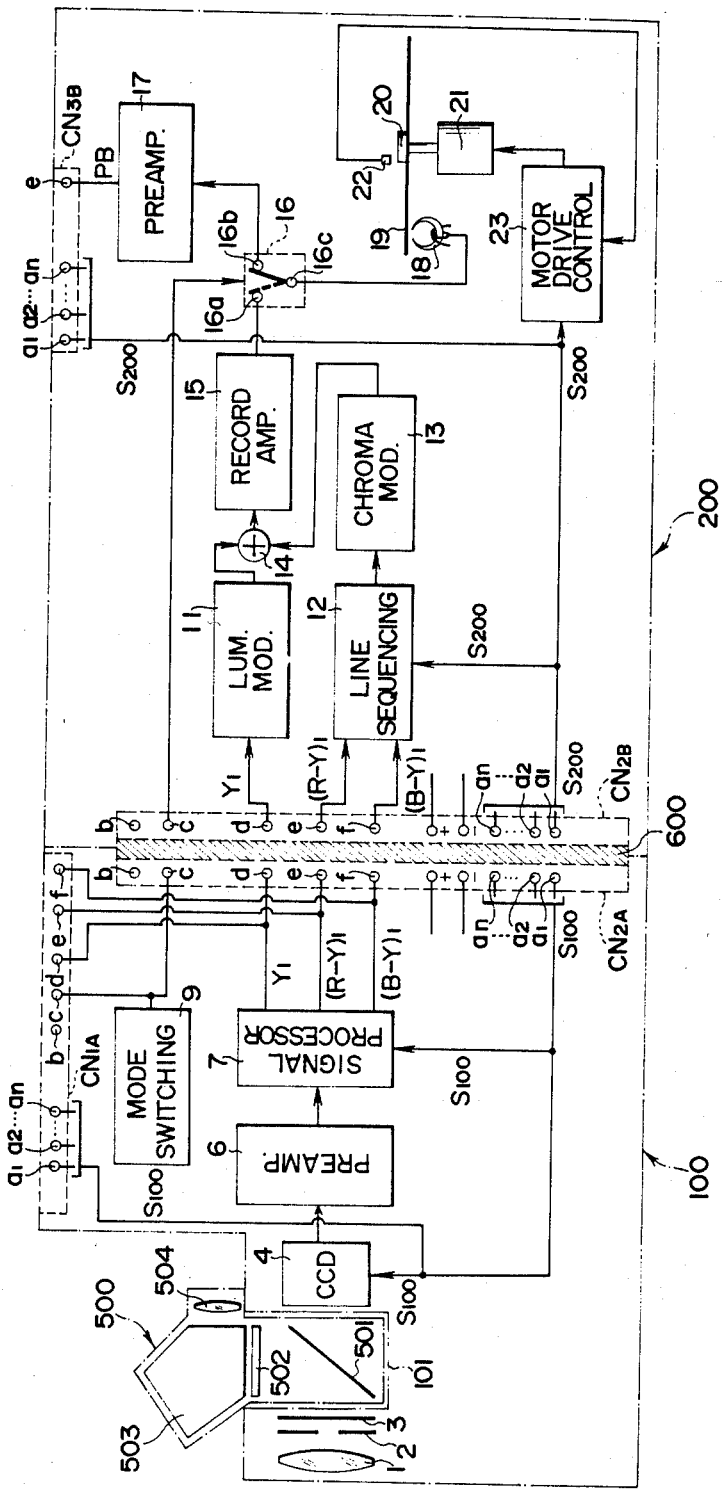
FIG. 15 is a circuit diagram of the electrical circuit of the electronic camera defined by coupling together the photographing unit and the record/playback unit of the electronic camera shown in FIG. 12 with an optical viewfinder.

When the relay connector 600 is used with the electronic camera for devoted recording purpose shown in FIG. 7, which comprises the photographing unit 100 and the record/playback unit 200 coupled together with the optical viewfinder 500 mounted thereon, there results a circuit arrangement as shown in FIG. 15. The relay connector 600 is coupled between the connectors CN2A and CN2B. Corresponding terminals of the connectors CN2A, CN2B are then connected together, and various sync signals from the sync signal generator 604 within the relay connector 600 are fed to the units 100, 200 through the terminals $a_1$ to $a_n$ and the sync signal lines $S_{100}$, $S_{200}$. When a switch, not shown, is operated to establish the record mode, the mode switching circuit 9 develops an output of H level, which activates the switch circuit 16 to connect its common terminal 16c to the normally off terminal 16a, as indicated by broken lines. Accordingly, a static or still image can be recorded on the magnetic disc 19 in the same manner as it occurs during the record mode with the electronic camera of FIG. 7.

It will thus be seen that in any combination of the units 100, 200 and 300, the various sync signals produced by the sync signal generator 604 which is internally contained within the relay connector 600 can be fed to the electrical circuits within the units 100, 200 and 300, thus simplifying the construction.

It is also to be noted that instead of using the relay connector 600 to provide a relay connection among the connectors CN1A, CN1B, CN2A, CN2B, CN3A and CN3B of the individual units, the sync signal generator which has been described above as contained within the relay connector 600 may be contained in one of the connectors CN1A to CN3B of a selected unit which is chosen depending on the frequency of use of a particular combination of the units 100, 200 and 300. It is also to be understood that the sync signals delivered by the sync signal generator are not limited to those described above. Alternatively, the generator may only produce a reference signal, which is received by each unit to develop a necessary signal as by frequency division.

Figure 16:
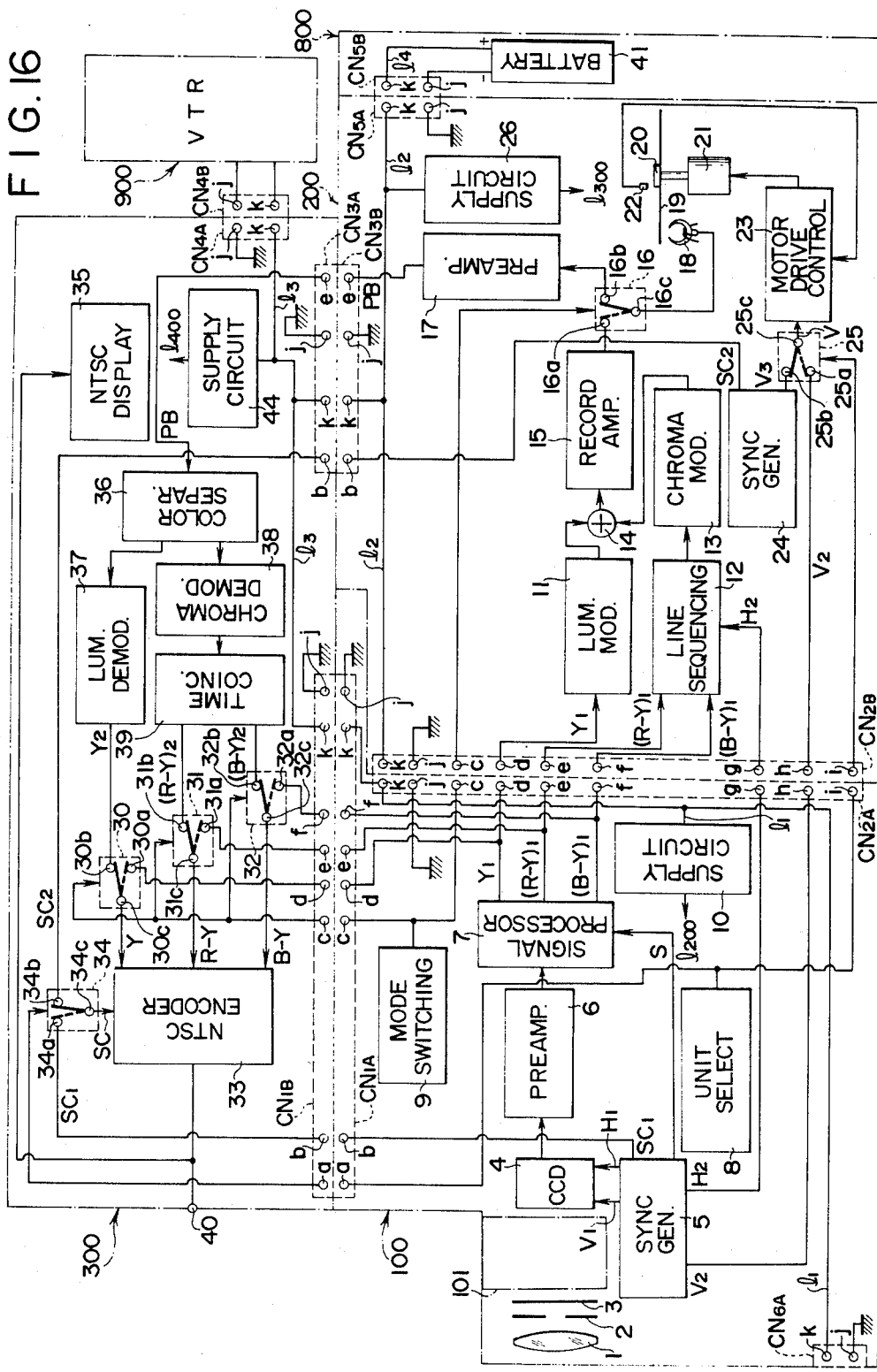
FIG. 16 is a circuit diagram of the electrical circuits within the individual units of a detachable unit electronic camera according to a third embodiment of the invention.

The electronic camera of the invention which is divided into plurality of units which can be coupled together in a detachable manner can be fed from a battery unit so that when an external equipment such as video tape recorder is connected to the electronic camera, the latter can be fed from a power supply associated with the equipment. In this embodiment, the electronic camera comprises a photographing unit 100, a record/playback unit 200, a picture monitor unit 300, and a battery unit 800, as shown in FIG. 16. These four units can be selectively and detachably coupled together.

The electrical coupling between the photographing unit 100 and the picture monitor unit 300 takes place by physically coupling the connector CN1A on the photographing unit 100 with the connector CN1B on the picture monitor unit 300. The electrical coupling between the unit 100 and the record/playback unit 200 takes place by physically coupling the connector CN2A on the unit 100 with the connector CN2B on the unit 200. The electrical coupling between the units 300 and 200 takes place by physically coupling the connector CN3A on the unit 300 with the connector CN3B on the unit 200. The record/playback unit 200 also includes another connector CN5A, which can be physically and electrically coupled with a connector CN5B that is disposed on the battery unit 800. The connector CN5B can also be physically and electrically coupled with a connector CN6A disposed on the photographing unit 100. The picture monitor unit 300 also includes a connector CN4A, which can be physically and electrically coupled with a connector CN4B disposed on a video tape recorder (hereafter abbreviated as VTR), representing an external equipment, the connector CN4B being connected with a power supply associated with the video tape recorder. It is to be understood that mechanical coupling means which permits a selectively coupling between the units 100, 200, 300 and 800 is not specifically illustrated.

A circuit arrangement for the power supply will now be described. Each of the connectors CN1A, CN2A, CN6A on the photographing unit 100 includes a terminal j, which is connected in common among these connectors and which is grounded to the casing of the unit 100. These connectors also include a terminal k which is connected in common to a bus $l_1$ which is in turn connected to a power supply circuit 10 to feed the various electrical circuits within the unit 100 through a bus $l_{200}$. The purpose of the power supply circuit 10 is to feed the electrical circuits within the photographing unit 100, and is suitably constructed, including a constant voltage circuit, a voltage booster circuit (not shown) or the like. It is to be understood that power supply circuits 26, 44, to be described later, are similarly constructed.

The connectors CN2B, CN3B, CN5A on the record/playback unit 200 include a terminal j, which is connected in common among these connectors and which is grounded to the casing of the unit 100, these connectors also include a terminal k, which is connected in common by a bus $l_2$, which is in turn connected to a power supply circuit 26 to feed the various electrical circuits within the unit 200 through a bus $l_{300}$. Similarly, the connectors CN1B, CN3A, CN4A on the picture monitor unit 300 include a terminal j which is grounded to the casing of the unit 300, and another terminal k which is connected in common by a bus $l_3$, which is in turn connected to a power supply circuit 44 to feed the various electrical circuits within the unit 300 through a bus $l_{400}$.

The battery unit 800 is provided with the connector CN5B which can be coupled with the connector CN5A. It contains a battery 41 such as a dry cell, nickel-cadmium battery or the like. The negative terminal of the battery 41 is connected to a terminal j of the connector CN5B while the positive terminal is connected to a terminal k of the connector CN5B through a bus $l_4$.

The connector CN4A on the picture monitor unit 300 is adapted to be coupled to the output of a power supply which is associated with VTR 900 through a cable and a connector CN4B. The connector CN4B has a terminal j which is connected to the negative terminal of the power supply, and a terminal k which is connected to the positive terminal of the power supply. In this manner, it is possible that the electrical circuits within the units 100, 200 and 300 be fed from the battery unit 800.

Accordingly, when the three units 100, 200 and 300 are coupled together to define an electronic camera which is capable of recording and playback operation, with the battery unit 800 electrically coupled to the combination, as shown in FIG. 16, the terminals a to f, k and j of the connector CN1A are electrically connected to the corresponding terminals a to f, k and j of the connector CN1B. Similarly, the terminals c to k of the connectors CN2A, CN2B are electrically interconnected as are the terminals b, e, j and k of the connectors CN3A, CN3B. In addition, the terminals j and k of the connectors CN5A, CN5B are electrically connected. As a consequence, the negative and the positive terminal of the battery 41 are connected to the record/playback unit 200 through the pair of connectors CN5B, CN5A, and also connected to the picture monitor unit 300 through the pair of connectors CN3B, CN3A, and further connected to the photographing unit 100 through the pair of connectors CN2B, CN2A. The positive voltage from the battery 41 feeds the power supply circuits 10, 26, 44 through the buses $l_1$ to $l_4$, and these power supply circuits feed the electrical circuits within the individual units 100, 200, 300 through the buses $l_{200}$, $l_{300}$, $l_{400}$, respectively. Accordingly, there can be achieved the same operation as that of the electronic camera described in connection with FIG. 3.

It will be appreciated that the recording and playback operation mentioned above takes place under the power supply from the battery 41 of the battery unit 800. However, during the recording mode, when it is desired to record a static or still image signal on the magnetic disc 19 as well as in VTR 900, the battery unit 800 is disconnected from the record/playback unit 200 while the connector CN4B on VTR 900 is coupled with the connector CN4A on the picture monitor unit 300. The output terminal of the unit 300 is connected to a video input, not shown, of VTR 900. In this manner, the units 100, 200 and 300 can be fed from the power supply associated with VTR 900, thus recording a static or still image signal on both the magnetic disc 19 and VTR 900. Also, during the playback mode, when VTR 900 is connected in the same manner as mentioned above, the still image signal which is obtained by a reproduction from the magnetic disc 19 can be recorded in VTR 900.

Figure 17:
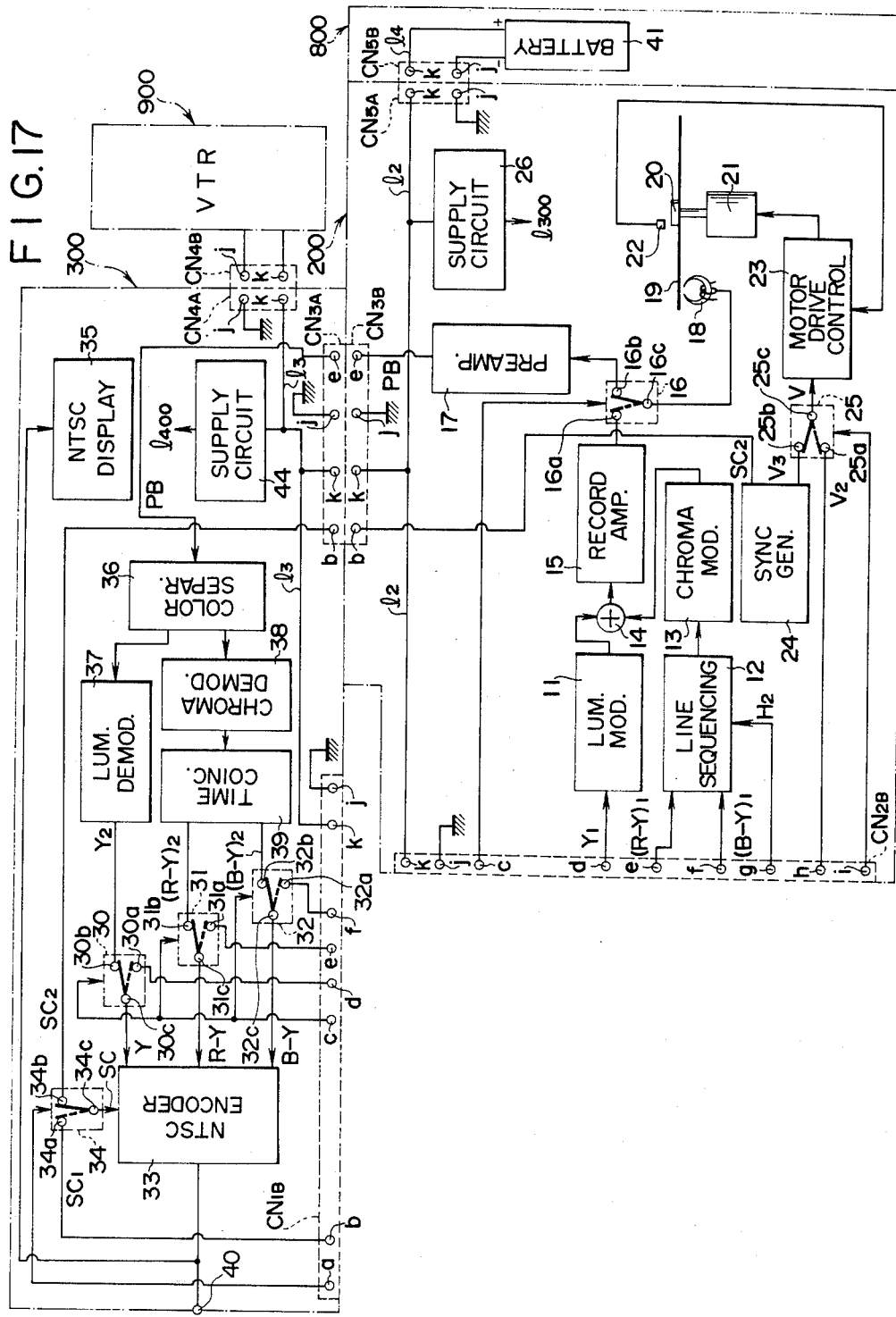
FIG. 17 is a circuit diagram of the electrical circuit of a devoted playback unit which is defined by the electronic camera of FIG. 16 from which the photographing unit is removed.

When the units 200 and 300 are coupled together to define a devoted playback unit, the battery unit 800 may be coupled with the combination as indicated in FIG. 17 to achieve entirely the same operation as mentioned above in connection with FIG. 5. Again, if the battery unit 800 is disconnected and VTR 900 is connected instead, the power supply associated with VTR 900 may feed the electrical circuits within the units 300, 200 through the buses $l_3$, $l_2$, thus allowing the still image signal reproduced from the magnetic disc 19 to be recorded in VTR 900.

Figure 18:
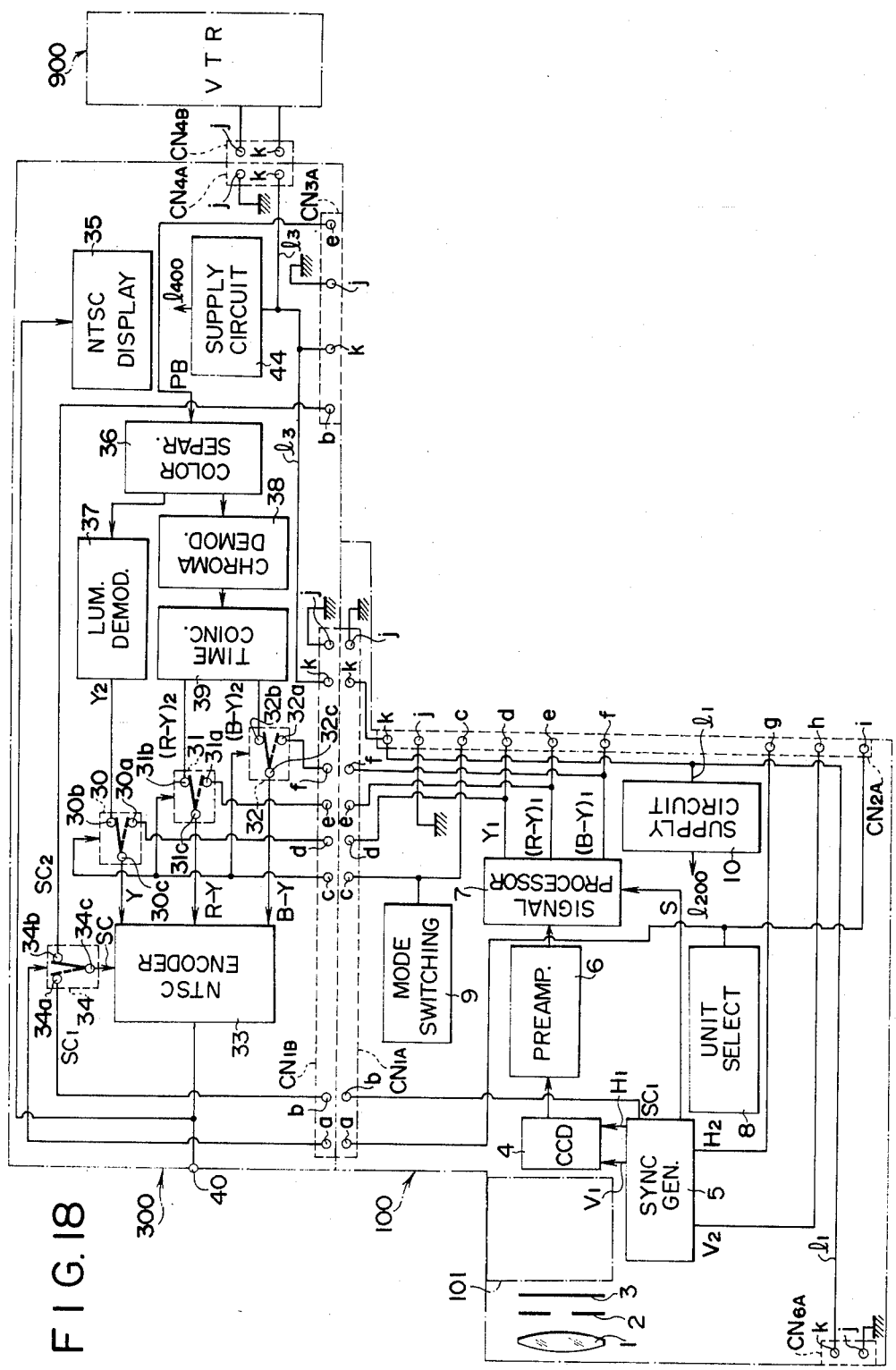
FIG. 18 is a circuit diagram of the electrical circuit of a video camera defined by the electronic camera of FIG. 16 from which the record/playback unit is removed.

When the photographing unit 100 and the picture monitor unit 300 are coupled together to define the video camera, a circuit arrangement results as shown in FIG. 18. In this instance, the unit select signal generator 8 develops an output of H level, which activates the switch circuit 34 to connect its common terminal 34c to its normally off terminal 34a, as indicated by broken lines. When a switch, not shown, is operated to establish the record mode, the mode switching circuit 9 develops an output of H level, which activates all of the switch circuits 30, 31, 32. Accordingly, in each of these switch circuits, the common terminal is connected to the normally off terminal.

Figure 6:
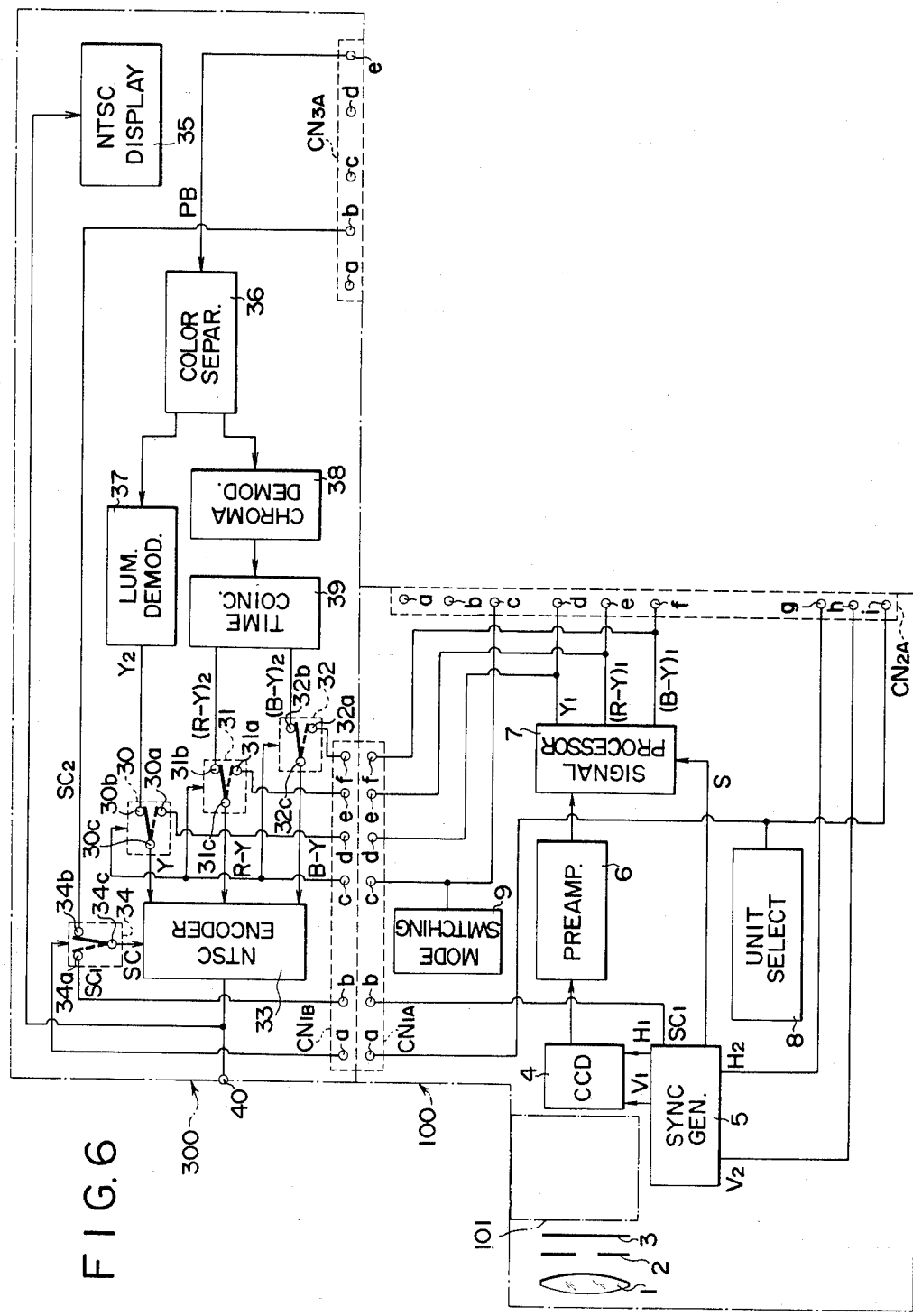
FIG. 6 is a block diagram of the electrical circuit of a video camera which is defined by coupling the photographing unit and the picture monitor unit of the electronic camera shown in FIG. 1.

Accordingly, an electronic image corresponding to a photographic image of an object being photographed can be displayed on the NTSC display 35 in the same manner as it occurs during the record mode using the video camera shown in FIG. 6. It will be seen that the output terminal 40 also delivers the NTSC color video signal, which can be supplied to a video input, not shown, of VTR 900, thereby allowing a motion picture signal to be recorded in addition to a still image signal.

In the various combinations described above, the battery unit 800 is attached to the record/playback unit 200. However, the battery 41 of the unit 800 may be connected to the connector CN6A of the photographing unit 100. Alternatively, the battery 41 may also be connected to the connector CN4A of the picture monitor unit 300. Instead of connecting an external power supply such as the power supply associated with VTR 900, for example, to the connector CN4A, it may be coupled to the connector CN5A or the connector CN6A.

Figure 19:
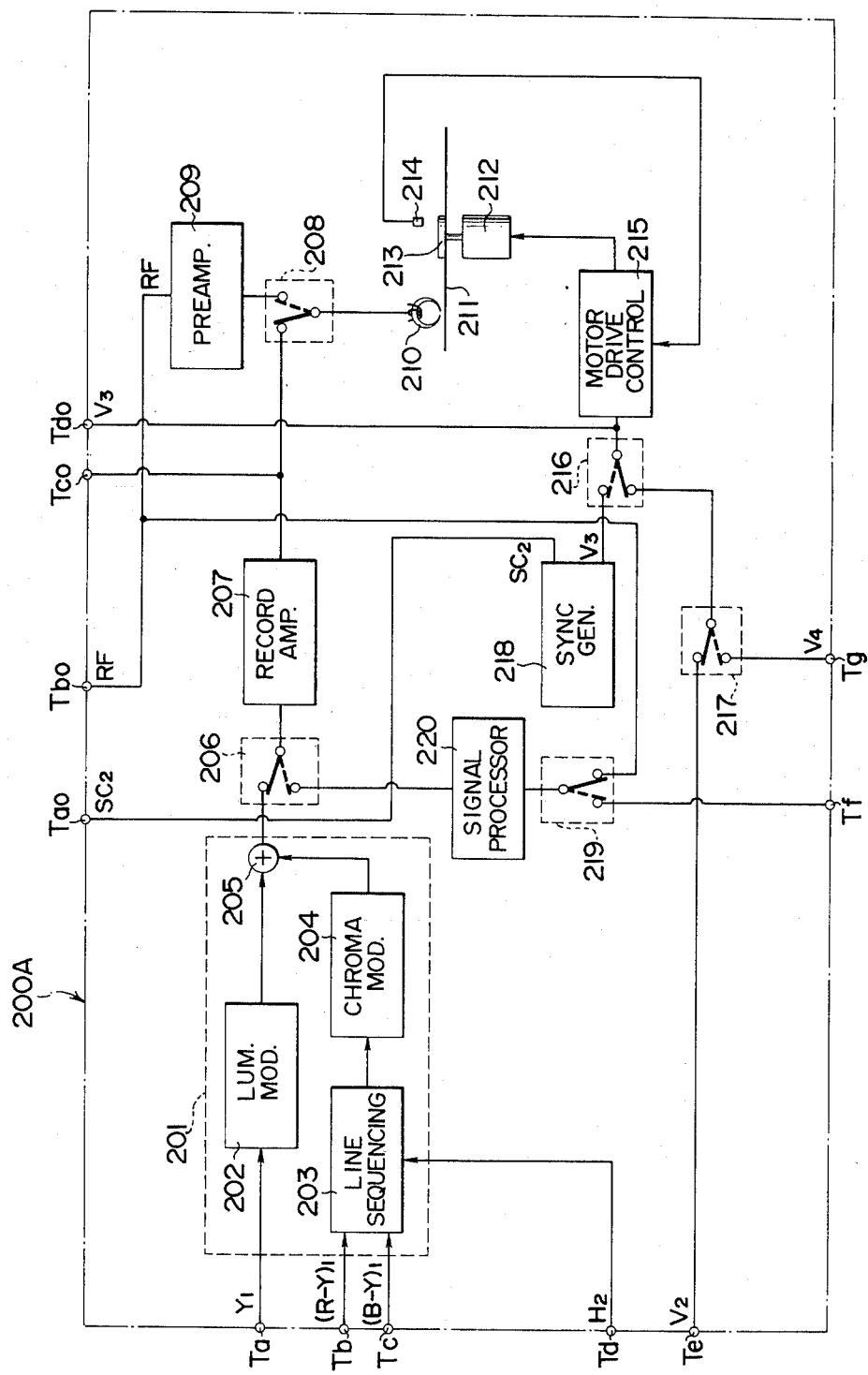
FIG. 19 is a circuit diagram of the electrical circuit of the record/playback unit of a detachable unit electronic camera according to a fourth embodiment of the invention.
Figure 23:
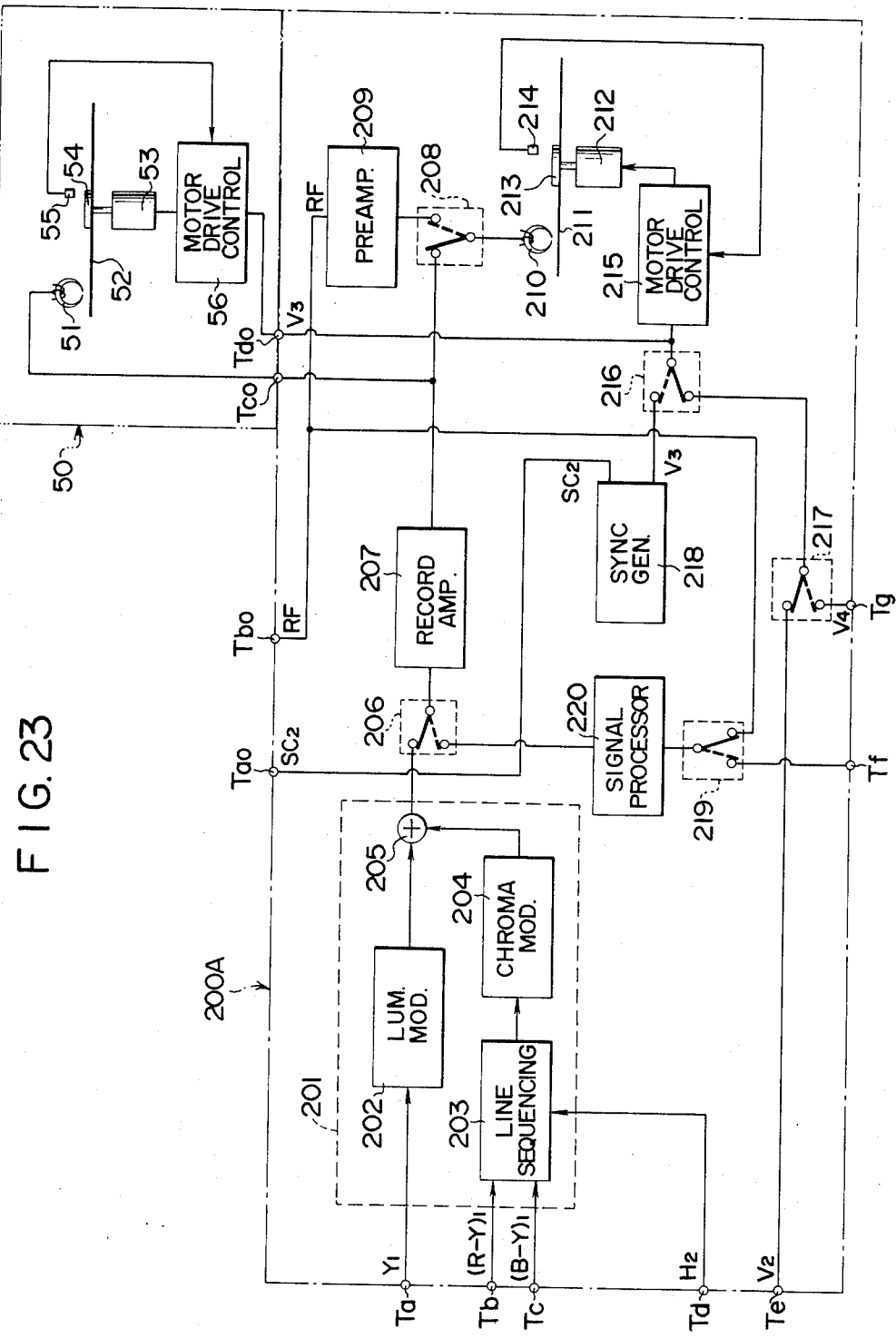
FIG. 23 is a circuit diagram of the electrical circuit of a dubbing apparatus defined by a combination of the record/playback unit and the dubbing unit of the electronic camera of the fourth embodiments.

It is also possible that the record/playback unit may be provided with a dubbing feature, which may be combined with a devoted dubbing unit to enable a dubbing operation. Such an embodiment of the invention is illustrated in FIG. 19 which shows a record/playback unit 200A. The unit 200A may be coupled through a connector with a devoted dubbing unit 50 shown in FIG. 20. The combination of the units 200A and 50 is shown in FIG. 23 as a dubbing apparatus.

Figure 21:
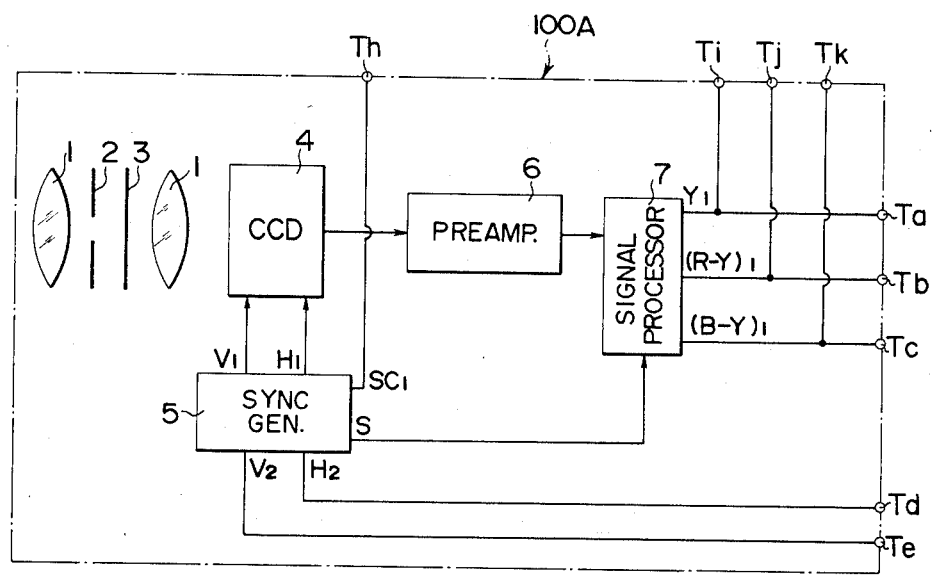
FIG. 21 is a circuit diagram of the photographing unit of the detachable unit electronic camera of the fourth embodiment.
Figure 24:
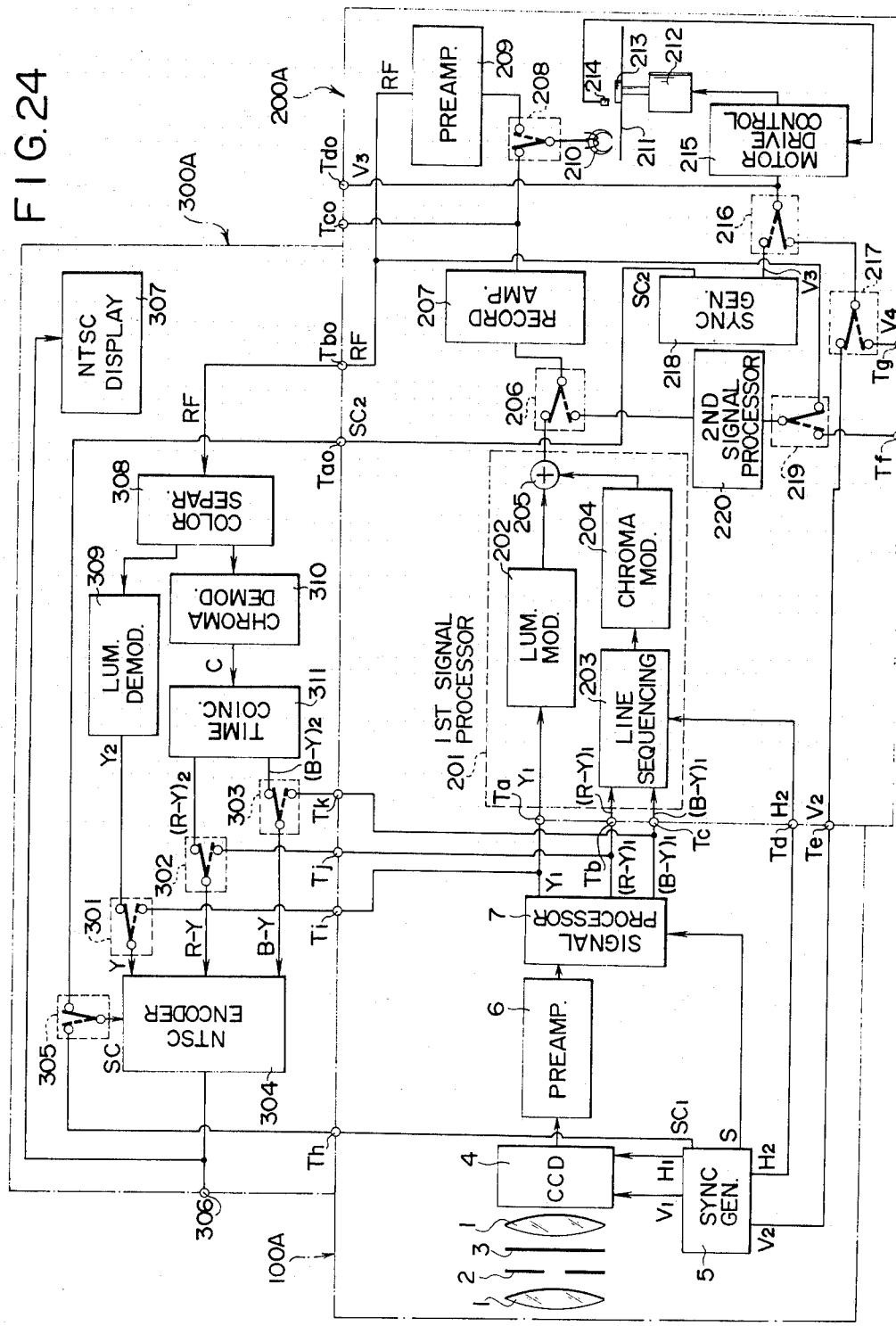
FIG. 24 is a circuit diagram of the electrical circuit of the electronic camera which comprises the photographing unit, the record/playback unit and the picture monitor unit.

It is also to be noted that the record/playback unit 200A is adapted to be coupled with a photographing unit 100A shown in FIG. 21 through a connector to define a circuit arrangement shown in FIG. 24. In addition, the record/playback unit 200A is also adapted to be coupled with a picture monitor unit 300A shown in FIG. 22 on its top side, through another connector, thus defining an electronic camera having a circuit arrangement as shown in FIG. 24.

The photographing unit 100A (see FIGS. 21 and 24) includes a taking lens 1 which functions to focus an image of an object being photographed. A diaphragm 2 and a shutter 3 are disposed on the optical path of the taking lens 1. Disposed on the focussing plane of the taking lens 1 is a solid camera element 4, for example, CCD4, which is subject to a two dimensional scan in response to a horizontal and a vertical sync drive signal $H_1$, $V_1$ delivered from a sync signal generator 5 to convert the light image into a two dimensional array of electrical signals. The output of CCD4 is connected through a preamplifier 6 to the input of a signal processing circuit 7. In response to an output signal from CCD4 and a sync signal S from the generator 5, the signal processing circuit 7 produces luminance signal $Y_1$ and color difference signals $(R-Y)_1$ and $(B-Y)_1$, which are delivered to connector terminals Ta, Tb, Tc associated with the record/playback unit 200A and to connect terminals Ti, Tj, Tk associated with the picture monitor unit 300A. The sync signal generator 5 delivers a horizontal and a vertical sync drive signal $H_2$, $V_2$ to connector terminals Td, Te associated with the record/playback unit 200A, and also delivers a subcarrier signal $SC_1$ to a connector terminal Th associated with the picture monitor unit 300A.

The construction of the record/playback unit 200A will now be described with reference to FIGS. 19 and 24. The connector terminal Ta associated with the photographing unit 100A is connected to the input of a luminance signal modulator 202 while connector terminals Tb, Tc, Td are connected to $(R-Y)_1$, $(B-Y)_1$ inputs and horizontal scan drive signal $H_2$ input of a line sequencing circuit 203. The output of the line sequencing circuit 203 is connected to the input of a chroma signal modulator 204, the output of which is connected to a summing circuit 205 together with the output from the luminance signal modulator 202, thus forming a signal which is suitable for recording on a magnetic disc. The combination of the luminance signal modulator 202, the line sequencing circuit 203, the chroma signal modulator 204 and the summing circuit 205 constitute together a first signal processing circuit 201. The output of the summing circuit 205 is connected to a normally on terminal of a first switch circuit 206, which also has a normally off terminal connected to the output of a second signal processing circuit 220. The common terminal of the switch circuit 206 is connected to the input of a record amplifier 207, the output of which is connected to a connector terminal Tco associated with the dubbing unit 50, to be described in detail later, and to the normally on terminal of a third switch circuit 208. The switch circuit 208 has a normally off terminal connected to the input of a preamplifier 209, the output of which is connected to a connector terminal Tbo associated with the picture monitor unit 300A which will be described later. The common terminal of the switch circuit 208 is connected to a magnetic head 210 which is used in a recording and playback operation.

The head 210 is supported by an actuator, not shown, so as to be movable in the radial direction of a magnetic disc 211. The disc 211 is centrally formed with a chucking which permits it to be mounted on a motor 212. The chucking is provided with a pulse generator yoke or PG yoke 213. A detecting coil 214 is located adjacent to th PG yoke to detect the position thereof, and is connected to one control input of a motor drive control circuit 215. The output of the control circuit 215 is connected to the spindle motor 212.

The unit 200A includes a sync signal generator 218. The generator 218 has an output connected to the normally off terminal of a fourth switch circuit 216, the normally on terminal of which is connected to the common terminal of a fifth switch circuit 217. The normally on terminal of the switch circuit 217 is connected to a connector terminal Te associated with the photographing unit 100A while the normally off terminal of the switch circuit 217 is connected to an input terminal Tg which receives a dubbing vertical sync drive signal $V_4$ as from an external recorder. The common terminal of the fourth switch circuit 216 is connected to the input of the motor drive control circuit 215 and to a connector terminal Tdo associated with the dubbing unit 50. The second signal processing circuit 220 has an input connected to the common terminal of the second switch circuit 219 having a normally off terminal connected to a dubbing signal input terminal Tf from an external recorder or the like, and a normally on terminal connected to the output of the preamplifier 209.

Figure 22:
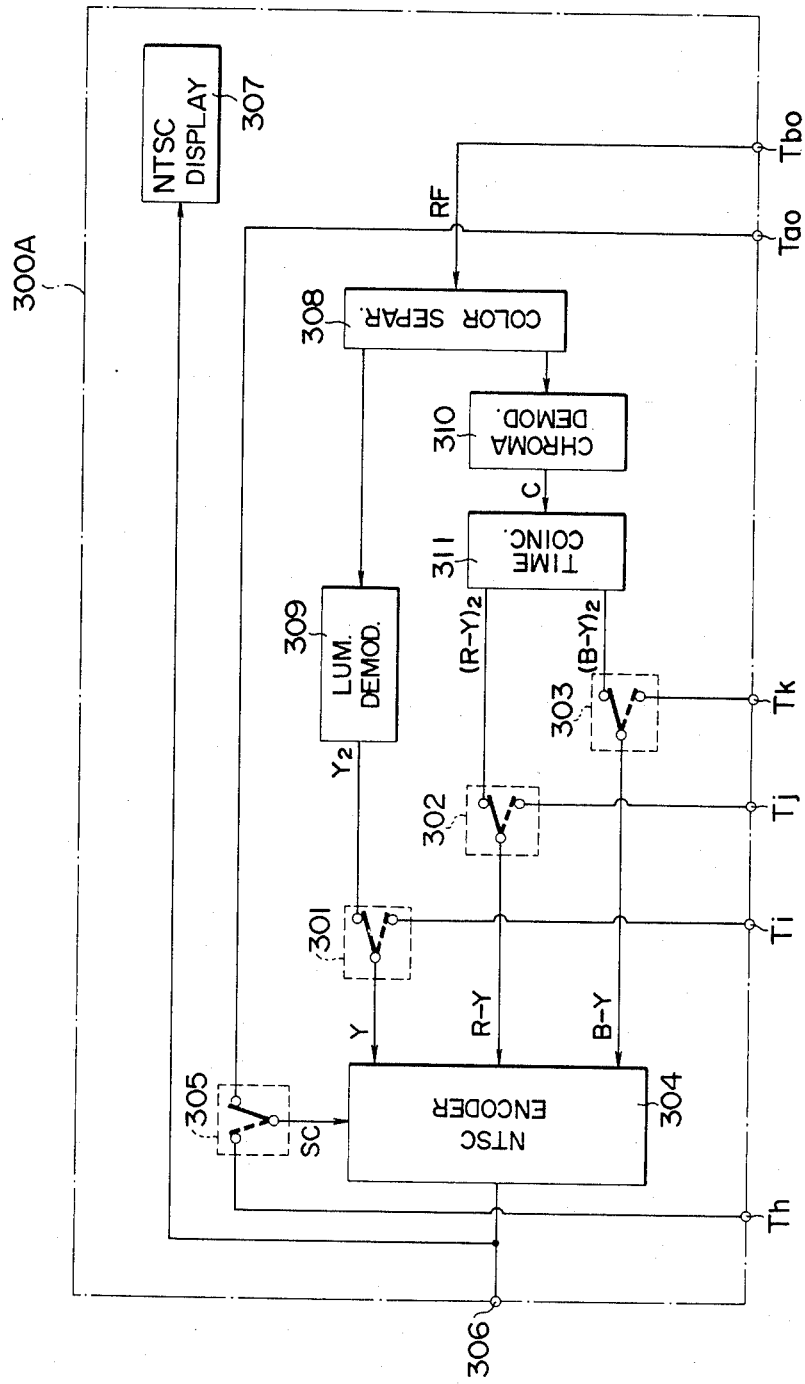
FIG. 22 is a circuit diagram of the electrical circuit of the picture monitor unit of the electronic camera of the fourth embodiment.

The picture monitor unit 300A will now be described with reference to FIGS. 22 and 24. The connector terminals Ti, Tj, Tk of the picture monitor unit 300A which are associated with the photographing unit 100A are connected to the respective normally off terminals of switch circuits 301, 302, 303, respectively, which have their common end connected to Y signal input, $(R-Y)$ signal input and $(B-Y)$ signal input, respectively, of NTSC encoder 304. The encoder 304 has another input which receives a subcarrier signal and which is connected to the common terminal of a switch circuit 305. The switch circuit 305 has a normally off terminal connected to a connector terminal Th associated with the photographing unit 100A and a normally on terminal connected to a connector terminal Tao associated with the record/playback unit 200A. The output of the encoder 304 is connected to an NTSC video signal output terminal 306 and also connected to the input of an NTSC display 307 which may comprise a CRT or liquid crystal display.

The unit 300A includes a connector terminal Tbo associated with the record/playback unit 200A which is connected to the input of a color separation circuit 308. The circuit 308 has an output terminal which delivers a luminance signal component and which is connected to a luminance signal modulator 309, which in turn delivers a $Y_2$ signal to the normally on terminal of the switch circuit 301. The color separation circuit 308 has another output terminal which delivers a chroma signal component and which is connected to a chroma signal demodulator 310. The demodulator 310 is connected to a time coincidence circuit 311, which is constructed in a well known manner to achieve a time coincidence in the occurrence of $(R-Y)$ and $(B-Y)$ signals which are inputted thereto in a line sequence. An output terminal of the circuit 311 which delivers the $(R-Y)_2$ signal is connected to the normally on terminal of the switch circuit 302 while an output terminal of the circuit 311 which delivers the $(B-Y)_2$ signal is connected to the normally on terminal of the switch circuit 303.

The dubbing unit 50 will now be described with reference to FIGS. 20 and 23. It includes a connector terminal Tco associated with the record/playback unit 200A which is connected to a magnetic head 51. It will be understood that the head 51 is supported by an actuator, not shown, so as to be movable in the radial direction of a magnetic disc 52. The disc 52 is centrally formed with a chucking member which permits it to be mounted on a spindle motor 53. The chucking member is also formed with a PG yoke 54, the position of which is detected by a detecting coil 55. The coil 55 is connected to one control input of a motor drive control circuit 56. The output of the control circuit 56 is connected to the spindle or stepping motor 53. The control circuit 56 has another input which is connected to a connector terminal Tdo associated with the record/playback unit 200A.

The electronic camera which is thus constructed in divisible units can operate in several different manners, illustrated below as combinations involving the record/playback unit 200A.

(11) The photographing unit 100A, the record/playback unit 200A and the picture monitor unit 300A may be combined together to provide an electronic camera capable of recording and playback operation and which additionally includes an electronic finder (see FIG. 24).

(12) The photographing unit 100A and the record/playback unit 200A may be combined to provide an electronic camera which is devoted for recording purpose only. (If required, an optical viewfinder may be combined.)

(13) The record/playback unit 200A and the picture monitor unit 300A may be combined to provide a playback unit.

(14) The record/playback unit may be combined with another record/playback unit of a similar kind or with an external video unit so as to receive a dubbing input signal therefrom to achieve a dubbing recording.

(15) The record/playback unit 200A may be combined with the dubbing unit 50 to provide a dubbing apparatus (see FIG. 23).

In addition, the photographing unit 100A and the picture monitor unit 300A may be combined to provide a video camera.

Initially, the operation of the combination (11) will be described. In this instance, the photographing unit 100A and the picture monitor unit 300A are physically coupled with the record/playback unit 200A, with their connector terminals electrically coupled together. When power is fed, the photographing unit 100A is capable of performing a photographing operation. The shutter 3 is opened, and an image of an object being photographed passes through the taking lens 1 to be focussed on the light incident surface of CCD 4. The amount of incident light on CCD4 can be adjusted by the diaphragm 2. The image which is focussed on CCD4 is subject to a two dimensional scan in response to a horizontal sync drive signal $H_1$ and a vertical sync drive signal $V_1$ delivered by the sync signal generator 5, whereby an electrical signal corresponding to the image is output from CCD4. This signal is initially amplified to a given level by the preamplifier 6, and is then fed to the signal processing circuit 7.

The signal processing circuit 7 then forms and delivers the luminance signal $Y_1$, and the color difference signals $(R-Y)_1$ and $(B-Y)_1$ in response to a sync signal S from the sync signal generator 5. These three signals are fed through the connector terminals Ti, Tj, Tk to the NTSC encoder 304 through the switch circuits 301, 302, 303 which are activated by a signal from a mode switching circuit, not shown. The subcarrier signal $SC_1$ is supplied through the connector terminal Th from the sync signal generator 5, and in response thereto, the encoder produces an NTSC color video signal, which is then applied to the output terminal 306 and also fed to the NTSC display 307 such as a liquid crystal display or CRT, thus allowing the focussed image on CCD4 to be displayed. By observing the image displayed by the electronic viewfinder, a distance adjustment and an adjustment of the focal length of the taking lens may be made as well as the set-up of the photographic composition. Subsequently when a release button is operated, the image on the display 307 can be recorded.

Specifically, the shutter 3 is closed once, and an exposure of CCD4 then takes place during a given exposure period. At the same time as the exposure occurs, a two dimensional scan of CCD4 takes place in response to the horizontal and the vertical sync drive signal $H_1$, $V_1$ supplied from the generator 5, and the output signal from CCD4 is amplified by the preamplifier 6 and then fed to the signal processing circuit 7. In this manner, the luminance signal $Y_1$ and the color difference signals $(R-Y)_1$ and $(B-Y)_1$ are developed at the output of the circuit 7, and are delivered through the connector terminals Ta, Tb, Tc to the luminance signal modulator 202 and the line sequencing circuit 203 within the first signal processing circuit 201 of the record/playback unit 200A. The luminance signal $Y_1$ is subject to an FM modulation and an emphasis by the modulator 202. The color difference signals $(R-Y)_1$ and $(B-Y)_1$ are converted into a line sequenced chroma signal by the line sequencing circuit 203 which receives a horizontal sync drive signal $H_2$ from the generator 5 through the connector terminal Td so that $(R-Y)_1$ and $(B-Y)_1$ signals occur for alternate horizontal scan lines. The resulting chroma signal is subject to an FM modulation and an emphasis by the chroma signal modulator 204. The output signals from the modulators 202 and 204 are mixed by the summing circuit 205, and the resulting mixture is fed through the first switch 206 to the record amplifier 207. The amplifier 207 performs a processing such as an equalization for recording to provide a signal of a given level which is suitable for magnetic recording, the signal being then fed through the third switch circuit 208 to the head 210.

It will be noted that at this time, the vertical sync drive signal $V_2$ from the generator 5 within the photographing unit 100A is fed through the connector terminal Te, the fifth switch circuit 217 and the fourth switch circuit 216 to the other control input of the motor drive control circuit 215. In this manner, the rotation of the spindle motor 212 is controlled to achieve one revolution per period (1/60 second) of the vertical sync drive signal $V_2$. During the rotation of the disc 211, the relative position between the head 210 and the disc 211 is subject to a phase control which responds to the position of the PG yoke 213 as detected by the detecting coil 214. In this manner, a magnetic record on the magnetic disc 211 is referenced to the position of the PG yoke.

On the other hand, when the signal which is previously recorded on the magnetic disc 211 is to be reproduced, the sync signal $V_2$ from the generator 5 within the photographing unit 100A is fed through the fifth switch circuit 217 and the fourth switch circuit 216 to the motor drive control circuit 215 for driving the magnetic disc 211. A weak signal from the head 210 is fed through the switch circuit 208 to the preamplifier 209 which performs an amplification to a given level as well as a playback equalization. The reproduced RF signal is fed through the connector terminal Tbo associated with the picture monitor unit 300A to the color separation circuit 308 where it is separated into the luminance signal component and the color difference signal component. The luminance signal component is subject to an FM demodulation and a given deemphasis by the luminance signal demodulator 309 to provide a $Y_2$ signal which is fed through the switch circuit 301 to the encoder 304. The color difference signal component is subject to an FM demodulation and a given deemphasis by the chroma signal demodulator 310, and a time coincidence circuit 311 produces the $(R-Y)_2$ signal and $(B-Y)_2$ signal which occur simultaneously. The $(R-Y)_2$ signal is fed through the switch circuit 302 to the encoder 304 as $(R-Y)$ signal while $(B-Y)_2$ signal is fed through the switch circuit 303 to the encoder 304 as $(B-Y)$ signal. The subcarrier signal $SC_1$ from the sync signal generator 5 is fed through the connector terminal Th associated with the photographing unit 100A and the switch circuit 305 to the encoder, which then produce an NTSC color video signal. This video signal is applied to the output terminal 306 and is also fed to the NTSC display 307, allowing an image corresponding to the reproduced signal from the magnetic disc 211 to be immediately displayed.

It will be noted that the combination (12) is devoid of the picture monitor unit 300A. Such combination is utilized to provide a portable electronic camera. The optical viewfinder 500 as shown in FIGS. 7 and 15 may be detachably mounted on the combination. The record/playback unit 200A serves only the record operation, which is entirely similar to the record operation of the combination (11) and hence will not be described.

The combination (13) removes the photographing unit 100A from the combination (11), and the record/playback unit 200A serves only the playback operation. It is to be noted that in the combination (11), the operation is based on the vertical sync drive signal $V_2$ from the generator 5 which is contained in the photographing unit 100A, but in the combination (13), the operation is based on the vertical sync drive signal $V_3$ and the subcarrier signal $SC_2$ from the sync signal generator 218 which is contained within the record/playback unit 200A.

Specifically, when the picture recorded on the magnetic disc 211 is to be reproduced, the switch circuit 216 is activated to the position indicated by broken lines to feed the vertical sync drive signal $V_3$ from the generator 218 to the motor drive control circuit 215 for driving the spindle motor 212 for rotation. A weak signal reproduced by the head 210 is fed through the switch circuit 208, which is then switched to the broken line position, to the preamplifier 209, which then amplifies it to a given level and which also performs a processing such as a playback equalization. The reproduced RF signal is fed through the connector terminal Tbo to the picture monitor unit 300A where a video processing such as the color separation is performed in the same manner as the playback operation for the combination (11), and the signal is then inputted to the encoder 304. The subcarrier signal $SC_2$ from the generator 218 is supplied through the terminal Tao and the switch circuit 305 to the encoder 304, which then produces an NTSC color video signal, which can be immediately displayed on the NTSC display 307 to allow the reproduced image to be viewed. Also the output terminal 306 may be connected to an external television set to be viewed thereon.

For the combination (14) where the record/playback unit 200A is used to perform a dubbing operation, the dubbing signal input terminal Tf and the dubbing vertical sync drive signal input terminal Tg are connected to an external record/playback apparatus. The switch 217 is activated to its broken line position while the switch circuit 216 is maintained in its solid line position, allowing the vertical sync drive signal $V_4$ to be fed to the motor drive control circuit 215. Consequently, the rotation of the spindle motor 212 is synchronized with the signal $V_4$. On the other hand, the signal supplied to the terminal Tf is fed to the second signal processing circuit 220 through the switch circuit 219 which is then activated to its broken line position. While not shown, the processing circuit 220 comprises a filter, an equalizer and a limiter to derive from the input signal an output signal which is similar in construction to the output from the first signal processing circuit 201. This output signal is fed to the record amplifier 207 through the switch 206 which is then activated to its broken line position. The amplifier 207 amplifies the output signal to a level which is suitable for recording, and the amplified signal is fed through the switch circuit 208 to the magnetic head 210. In this manner, an image which is previously recorded on the external recorder can be dubbed on the disc 211.

Figure 20:
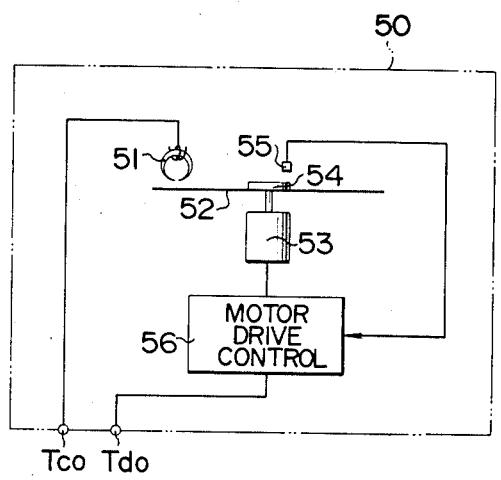
FIG. 20 is a circuit diagram of a dubbing unit which may be combined with the record/playback unit of FIG. 19.

For the combination (15), the dubbing unit 50 shown in FIG. 20 is combined with the record/playback unit 200A. A magnetic disc which has a signal previously recorded thereon is loaded into the record/playback unit 200A, whereupon it is mounted on the spindle motor 212 through the chucking member for rotation. The switch circuit 216 is now activated to its broken line position, whereby the vertical sync drive signal $V_3$ from the sync signal generator 218 contained within the record/playback unit 200A is fed to the motor drive control circuit 215. A signal reproduced by the head 210 is fed through the switch circuit 208, which is then activated to its broken line position, to the preamplifier 209 which amplifies it to a given level. The reproduced RF signal is fed through the switch circuit 219 to the second signal processing circuit 220. In the signal processing circuit 220, the reproduced signal is separated into the luminance signal component and the color difference signal component, which are equalized to signals suitable for recording and then mixed by a summing circuit to derive a signal which is similar to the output from the first signal processing circuit 201. The switch circuit 206 is activated to its broken line position, whereby this signal is fed to the record amplifier 207 to be amplified therein and then fed through the terminal Tco to be applied to the magnetic head 51 of the dubbing unit 50.

On the other hand, the vertical sync drive signal $V_3$ from the generator 218 is fed through the switch circuit 216, which is then activated to its broken line position, and through the terminal Tdo to the motor drive circuit 56 within the dubbing unit 50. The disc 52 is driven for rotation at a rate of one revolution per period of the sync signal $V_3$. The rotation of the disc 52 is also controlled through a phase control which responds to the relative position of the head 51 with respect to the disc 52 as detected by the combination of the PG yoke 54 and the detecting coil 55. In this manner, a magnetic record is made on the magnetic disc 52 as referenced to the position of the PG yoke. The dubbing unit 50 disclosed is constructed as a simple arrangement including the spindle motor, the motor drive control circuit which drives the magnetic disc, the magnetic recording head and the chucking member, for ease of use of the electronic camera in extended applications.

It should be noted that the individual switch circuits may be switched by a manual operation. Alternatively, a mode switching circuit may be used to achieve automatic switching depending on the record or the playback mode. As a further alternative, an automatic switching may also be achieved depending on the particular combination of individual units coupled together.

What is claimed is:

1. A detachable unit electronic camera system comprising:
    a photographing unit including camera means which converts an image of an object being photographed which is focussed by a photographing optical system into an electrical signal, and a signal processing circuit for producing a luminance signal and color difference signals in response to an output signal from the camera means;

a record/playback unit including image recording means responsive to an output signal from the signal processing circuit for magnetically recording on a magnetic disc a video signal which is based on the output signal from the camera means, and magnetic reproducing means for reading the signal which is previously recorded on the magnetic disc; and a picture monitor unit including a reproduced signal processing circuit responsive to a signal reproduced by the magnetic reproducing means for producing a reproduced luminance signal and reproduced color difference signals, an encoder responsive to an output from the reproduced signal processing circuit for producing a composite color video signal, and a display for displaying a picture based on an output signal from the encoder;

the photographic unit, the record/playback unit and the picture monitor unit being detachable units which can be selectively coupled together by cooperating coupling means provided in each unit, each of said units having at least two coupling means, each of said coupling means being provided for coupling to the associated coupling means of a different one of the other units connectable therewith; control means provided in only one of said units for selectively activating the units connected therewith to operate to record signals when in a first state and to play back recorded signals when in a second state.

2. A detachable unit electronic camera according to claim 1 in which the camera means within the photographing unit comprises a lens, an iris, a shutter and CCD means on which an image of an object being photographed is focussed.

3. A detachable unit electronic camera according to claim 1 in which the signal processing circuit within the photographing unit comprises a circuit which receives an output from the camera means and a sync signal from a sync signal generator for producing a luminance signal Y and color difference signals (R−Y) and (B−Y).

4. A detachable unit electronic camera according to claim 1 in which the image recording means of the record/playback unit comprises a luminance signal modulator, a line sequencing circuit, a chroma signal modulator, a summing circuit which combines an output signal form the chroma signal modulator with an output signal from the luminance signal modulator, a record amplifier for amplifying an output signal from the summing circuit, a combination recording and reproducing magnetic head to which and from which a signal is fed from or to the amplifier, said head magnetically recording said output signal on said magnetic disc.

5. A detachable unit electronic camera according to claim 1 in which the magnetic reproducing means within the record/playback unit comprises a combined recording and reproducing magnetic head which reproduces a recorded signal on said magnetic disc, and a preamplifier for amplifying a reproduced signal from said magnetic head.

6. A detachable unit electronic camera according to claim 1 in which said reproduced signal processing circuit within the picture monitor unit comprises a color separation circuit, a luminance signal demodulator, a chroma signal demodulator and a time coincidence circuit.

7. A detachable unit electronic camera according to claim 1 in which each coupling means includes means for electrically connecting the unit in which the coupling means is provided to an associated unit to thereby provide electrical connections therebetween.

8. A detachable unit electronic camera according to claim 7 wherein each unit is provided with a plurality of coupling means for simultaneously releasably electrically coupling each unit to a plurality of the other units.

9. A detachable unit electronic camera according to claim 8 wherein selected signals developed in each of said units are electrically coupled in common to a plurality of coupling means provided in said unit.

10. An electronic camera capable of recording and playback operation, comprising:

a photographing unit including camera means which converts an image of an object being photographed which is focussed by a photographing optical system into an electrical signal, and a signal processing circuit responsive to an output signal from the camera means for producing a luminance signal and color difference signals;

a record/playback unit including image recording means responsive to an output from the signal processing circuit for recording a video signal, which is based on the output signal from the signal processing circuit, on a magnetic disc, and magnetic reproducing means which reads a signal which is previously recorded on the magnetic disc;

and a picture monitor unit including a reproduced signal processing circuit responsive to a signal reproduced by the magnetic reproducing means for producing a reproduced luminance signal and reproduced color difference signals, an encoder responsive to an output from one of the circuits including the reproduced signal processing circuit and the signal processing circuit for producing a composite color video signal, and a display for displaying a picture based on an output signal from the encoder;

the photographing unit, the record/playback unit and the picture monitor unit being physically coupled together by cooperating releasable coupling means provided on each unit.

11. An electronic camera according to claim 10 in which said display comprises an electronic viewfinder formed by CRT means.

12. An electronic camera according to claim 10 in which said picture monitor unit includes means for connnecting a power supply to said magnetic playback circuit within said record/playback unit whenever the photographing unit, the record/playback unit and the picture monitor unit are coupled together to define an electronic camera.

13. A devoted playback apparatus, comprising:

a magnetic disc and magnetic reproducing means for reading a signal previously recorded on the magnetic disc; and a picture monitor unit including a reproduced signal processing circuit responsive to a signal reproduced by the magnetic reproducing means for producing a reproduced luminance signal and reproduced color difference signals, an encoder responsive to an output from the reproduced signal processing circuit to produce a composite color video signal, and a display for displaying a picture based on an output signal from the encoder the record/playback unit and the picture monitor unit being physically coupled together by cooperating coupling means, said cooperating coupling means including means for activating said reproducing means only when cooperating coupling means are connected together.

14. A devoted playback apparatus according to claim 13 in which the display comprises an electronic viewfinder formed by CRT means.

15. A video camera comprising:
a photographing unit including camera means which converts a photographic image of an object being photographed which is focussed by a photographic optical system into an electrical signal, and a signal processing circuit for producing a luminance signal and color difference signals responsive to an output signal from the camera means; and
a picture monitor unit including a reproduced signal processing circuit having an input and being responsive to a signal applied to said input for producing a reproduced luminance signal and reproduced color difference signals, an encoder responsive to an output from one of the circuits including the reproduced signal processing circuit and the signal processing circuit for producing a composite color video signal, and a display for displaying a picture based on an output signal from the encoder, the photographing unit and the picture monitor unit being physically releasably coupled together by coupling means, means in one of said units for controlling operation of both of said units when the units are connected by said coupling means.

16. A video camera according to claim 15 in which the display comprises an electronic viewfinder formed by CRT means.

17. An electronic camera for devoted use in recording, comprising:
a photographing unit including camera means for converting a photographic image of an object being photographed which is focussed by a photographing optical system into an electrical signal, and a signal processing circuit for producing a luminance signal and color difference signals responsive to an output signal from he camera means; and
a record/playback unit including image recording means responsive to an output signal from the signal processing circuit for magnetically recording on a magnetic disc a video signal which corresponds to the output signal and magnetic reproducing means for reading a signal previously recorded on the magnetic disc,
the photographing unit and the record/playback unit being physically coupled together by said coupling means to permit the image being photographed to be monitored by an optical viewfinder, means in one of said units for controlling operation of both of said units when the units are connected by said coupling means.

18. An electronic camera according to claim 17 in which the optical viewfinder is constructed with means to permit the photographic image of the object to be observed through an optical branch from the optical path of the photographing optical system in the electronic camera.

19. An electronic camera according to claim 18 in which the optical viewfinder means comprises a half mirror disposed at an angle within the taking optical path, a finder screen on which the light image as reflected by the half mirror is focussed, a pentaprism for converting the image on the finder screen into an erect image, and an eyepiece.

20. An electronic camera according to claim 16 in which said camera means includes a mounting surface for mounting said optical viewfinder means and having a space provided between said converting means and said photographic optical system positioned immediately above a portion of said mounting means;
said optical viewfinder means half mirror being arranged to extend into said space when said optical viewfinder means is mounted upon said viewfinder mounting means.

21. A detachable unit electronic camera comprising:
a photographic unit including camera means for converting a photographic image of an object being photographed which is focussed by a photographing optical system into an electrical signal, and a signal processing circuit for producing a luminance signal and color difference signals responsive to an output signal from the camera means;
a record/playback unit including image recording means responsive to an output signal from the signal processing circuit for magnetically recording on a magnetic disc a video signal which corresponds to the output signal from the camera means, and magnetic reproducing means for reading a signal which is previously recorded on the magnetic disc;
a picture monitor unit including a reproduced signal processing circuit responsive to a signal reproduced by the magnetic reproducing means for producing a reproduced luminance signal and reproduced color difference signals, an encoder responsive to an output from one of the circuits including the reproduced signals processing circuit and the signal processing circuit for producing a composite color video signal, and a display for displaying a picture based on an output signal from the encoder; and
a power supply unit which internally houses a battery;
the photographing unit, the record/playback unit, the picture monitor unit and the power supply unit being detachably coupled together by coupling means provided in each unit so as to permit them to be used in a selected combination,
each of the photographing unit, the record/playback unit and the picture monitor unit including a supply bus which can be connected to the battery within the power supply unit or an external power supply through said coupling means.

* * * * *

UNITED STATES PATENT AND TRADEMARK OFFICE
CERTIFICATE OF CORRECTION

PATENT NO. : 4,746,990

DATED : May 24, 1988

INVENTOR(S) : Akira Katoh; Masatoshi Ida; Yutaka Yunoki;
Hisayuki Harada; Manabu Inoue; Yoshio Fukuda It is certified that error appears in the above-identified patent and that said Letters Patent is hereby corrected as shown below:

On TITLE PAGE: Abstract

Line 5, delete "a" and after "camera" insert --means--.

Column 2, line 50, after "such" insert --as--.

Column 3, line 44, change "member" to --number--.

Column 8, line 29, change "e" to --c--.

Column 19, line 49, change "th" to --the--.

Claim 17, column 27, line 45, change "he" to --the--.

Signed and Sealed this

Fifth Day of November, 1991

Attest:

HARRY F. MANBECK, JR.

*Attesting Officer*  *Commissioner of Patents and Trademarks*